United States Patent
Ku et al.

(10) Patent No.: US 12,204,370 B2
(45) Date of Patent: Jan. 21, 2025

(54) ELECTRONIC DEVICES WITH MOVEABLE DISPLAY SCREENS

(71) Applicant: Intel Corporation, Santa Clara, CA (US)

(72) Inventors: Jeff Ku, Taipei (TW); Jose Oviedo Salazar, San Jose (CR); Twan Sing Loo, Penang (MY); Khai Ern See, Batu Gajah (MY); Min Suet Lim, Penang (MY)

(73) Assignee: Intel Corporation, Santa Clara, CA (US)

( * ) Notice: Subject to any disclaimer, the term of this patent is extended or adjusted under 35 U.S.C. 154(b) by 699 days.

(21) Appl. No.: 17/359,224

(22) Filed: Jun. 25, 2021

(65) Prior Publication Data

US 2021/0397219 A1   Dec. 23, 2021

(51) Int. Cl.
*G06F 1/16* (2006.01)

(52) U.S. Cl.
CPC .......... *G06F 1/1624* (2013.01); *G06F 1/1616* (2013.01); *G06F 1/1662* (2013.01); *G06F 2200/1634* (2013.01)

(58) Field of Classification Search
CPC .................................................. G06F 1/1652
See application file for complete search history.

(56) References Cited

U.S. PATENT DOCUMENTS

| | | | | |
|---|---|---|---|---|
| 5,448,446 A | * | 9/1995 | Honda ................... | G06F 1/1635 361/679.09 |
| 5,739,810 A | * | 4/1998 | Merkel ................... | G06F 1/1616 361/679.2 |
| 5,790,053 A | * | 8/1998 | Chang ................... | G06F 1/1667 400/489 |
| 5,818,360 A | * | 10/1998 | Chu ....................... | G06F 1/1667 345/169 |
| 6,016,176 A | * | 1/2000 | Kim ........................ | G09F 9/301 349/158 |
| 8,009,422 B2 | * | 8/2011 | Misawa ............. | G02F 1/133308 345/157 |
| 10,254,803 B1 | * | 4/2019 | Quinn ................... | G06F 1/1688 |
| 10,929,016 B1 | * | 2/2021 | Liu ........................ | G06F 1/1643 |
| 11,023,016 B2 | * | 6/2021 | Kim ....................... | G06F 3/0221 |
| 11,262,794 B2 | * | 3/2022 | Wen ...................... | G06F 3/0202 |
| D949,845 S | * | 4/2022 | Wu ........................ | D14/316 |
| 11,347,367 B2 | * | 5/2022 | Hong .................... | G06F 1/1641 |
| 11,899,502 B2 | * | 2/2024 | Hung .................... | G06F 1/1698 |
| 2006/0061555 A1 | * | 3/2006 | Mullen ................. | G06F 1/1637 345/169 |
| 2011/0001641 A1 | * | 1/2011 | Tung .................... | G06F 3/04144 341/23 |
| 2011/0176260 A1 | * | 7/2011 | Walters ............... | H04M 1/0268 361/679.01 |

(Continued)

*Primary Examiner* — Adrian S Wilson
(74) *Attorney, Agent, or Firm* — Hanley, Flight & Zimmerman, LLC

(57) ABSTRACT

Electronic devices with moveable display screens are described herein. An example electronic device includes a lid having a first display screen and a base. The lid is moveably coupled to the base. The base includes a housing having a top side and a bottom side, a physical keyboard to be accessed on the top side of the housing, and a second display screen moveable between a first position in which the keyboard is exposed and a second position in which the second display screen covers the keyboard.

20 Claims, 12 Drawing Sheets

(56) References Cited

U.S. PATENT DOCUMENTS

| | | | |
|---|---|---|---|
| 2018/0232010 A1* | 8/2018 | Kummer | H04M 1/0235 |
| 2020/0133331 A1* | 4/2020 | Ferris | H05K 5/0217 |
| 2021/0397219 A1* | 12/2021 | Ku | G06F 1/1652 |
| 2022/0269311 A1* | 8/2022 | Hung | G06F 1/1679 |

* cited by examiner

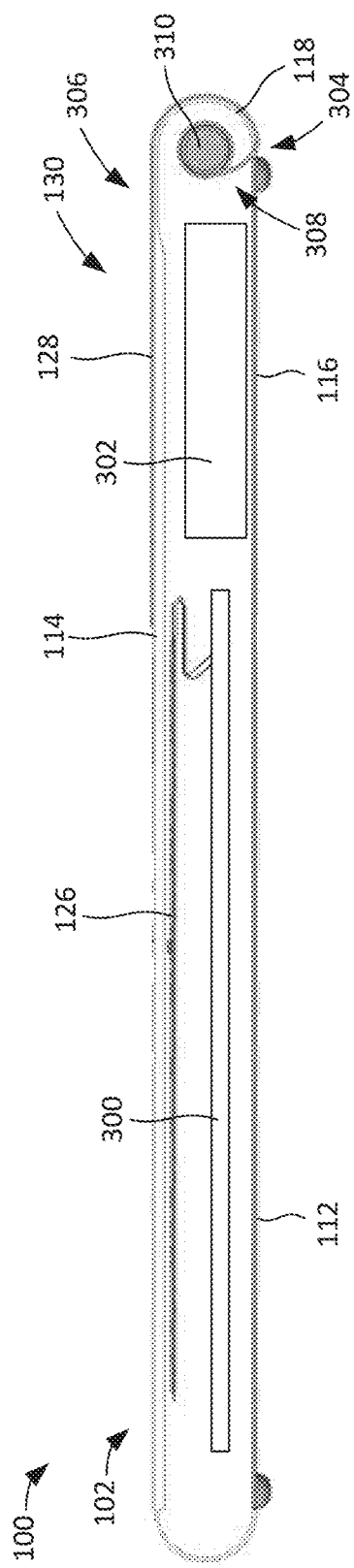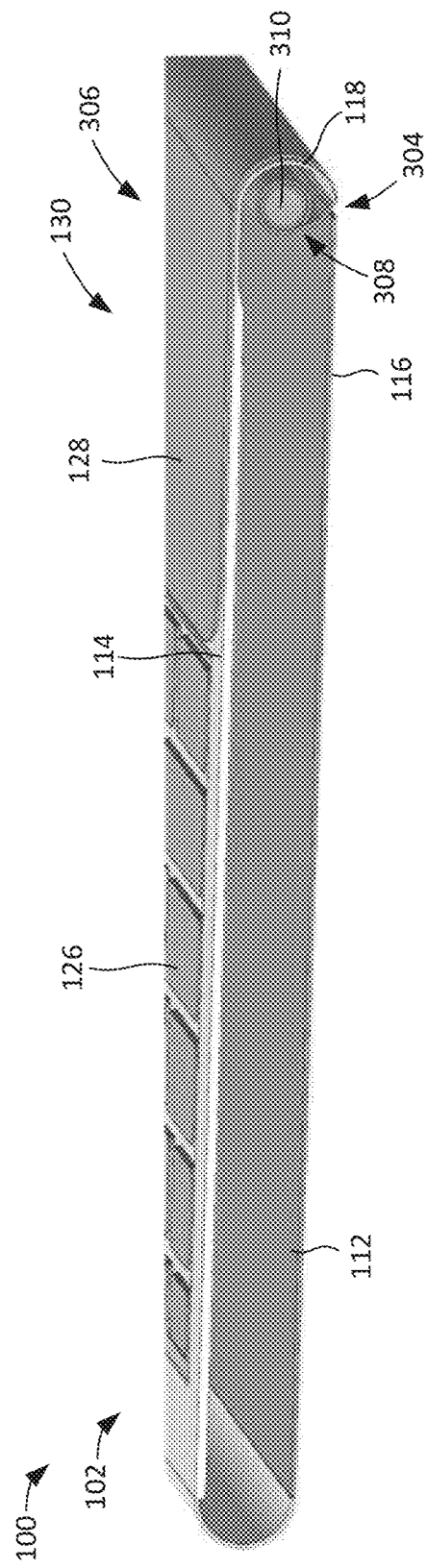
FIG. 3
FIG. 4

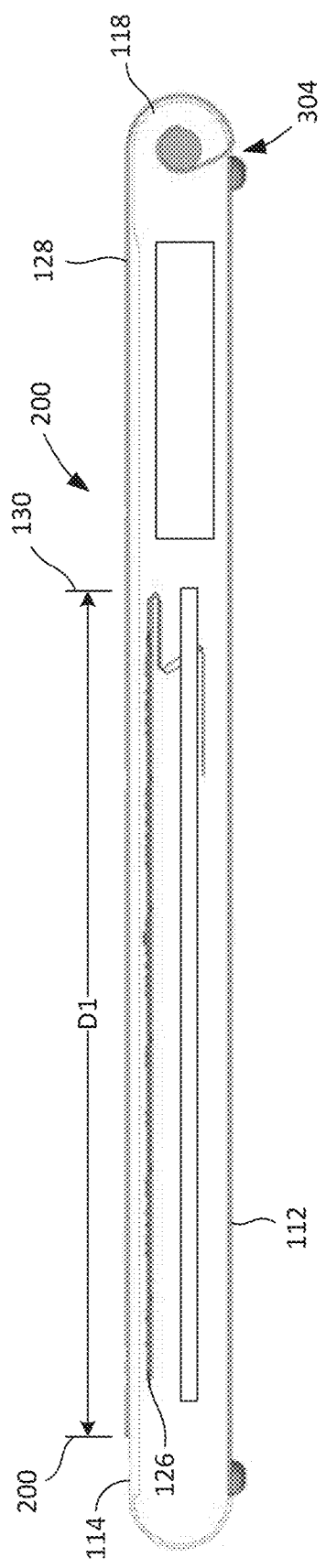
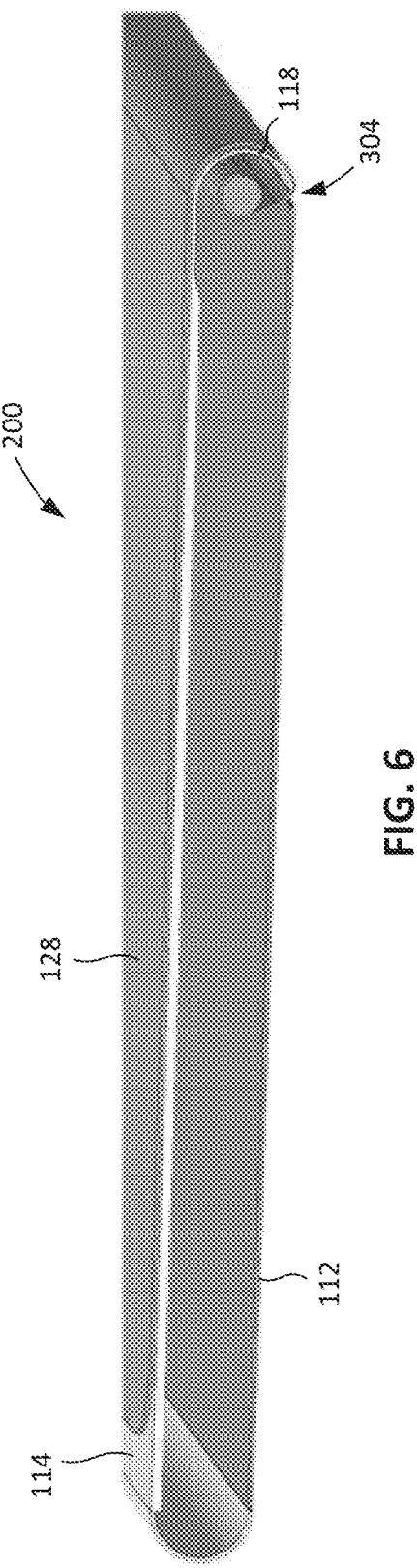
FIG. 5
FIG. 6

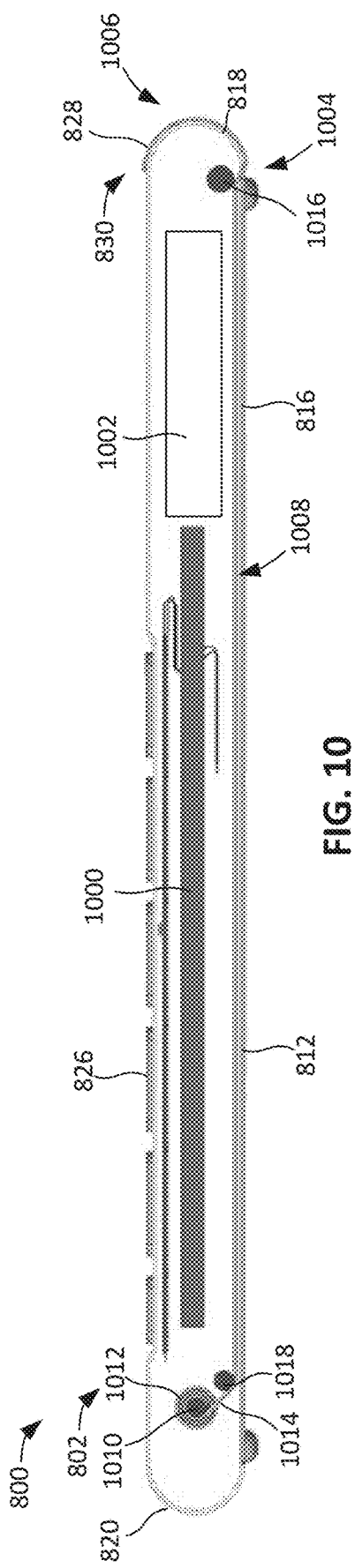
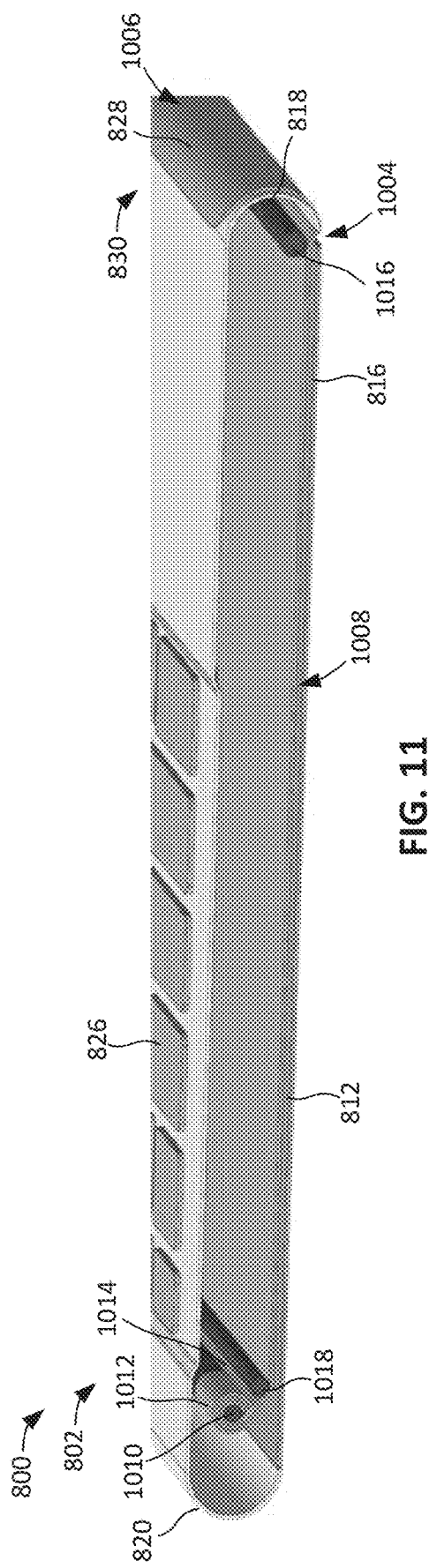

ELECTRONIC DEVICES WITH MOVEABLE DISPLAY SCREENS

FIELD OF THE DISCLOSURE

This disclosure relates generally to electronic devices and, more particularly, to electronic devices with moveable display screens.

BACKGROUND

Some known electronic devices, such as laptop computers, are configured with dual displays. For example, a first display screen may be on the lid of the laptop computer and a second display screen may be on the base of the laptop computer.

BRIEF DESCRIPTION OF THE DRAWINGS

FIG. 1 shows the example moveable display screen in a first position in which an example keyboard on the example base is exposed.

FIG. 3 is a side view of the example electronic device of FIG. 1 with the example moveable display screen in the first position.

FIG. 4 is a perspective side view of the example electronic device of FIG. 1 with the example moveable display screen in the first position.

FIG. 5 is a side view of the example electronic device of FIG. 1 with the example moveable display screen in the second position.

FIG. 6 is a perspective side view of the example electronic device of FIG. 1 with the example moveable display screen in the second position.

FIG. 8 shows the example moveable display screen in a first position in which an example keyboard and an example trackpad on the example base are exposed.

FIG. 10 is a side view of the example electronic device of FIG. 8 with the example moveable display screen in the first position.

FIG. 11 is a perspective side view of the example electronic device of FIG. 8 with the example moveable display screen in the first position.

Figure 1:
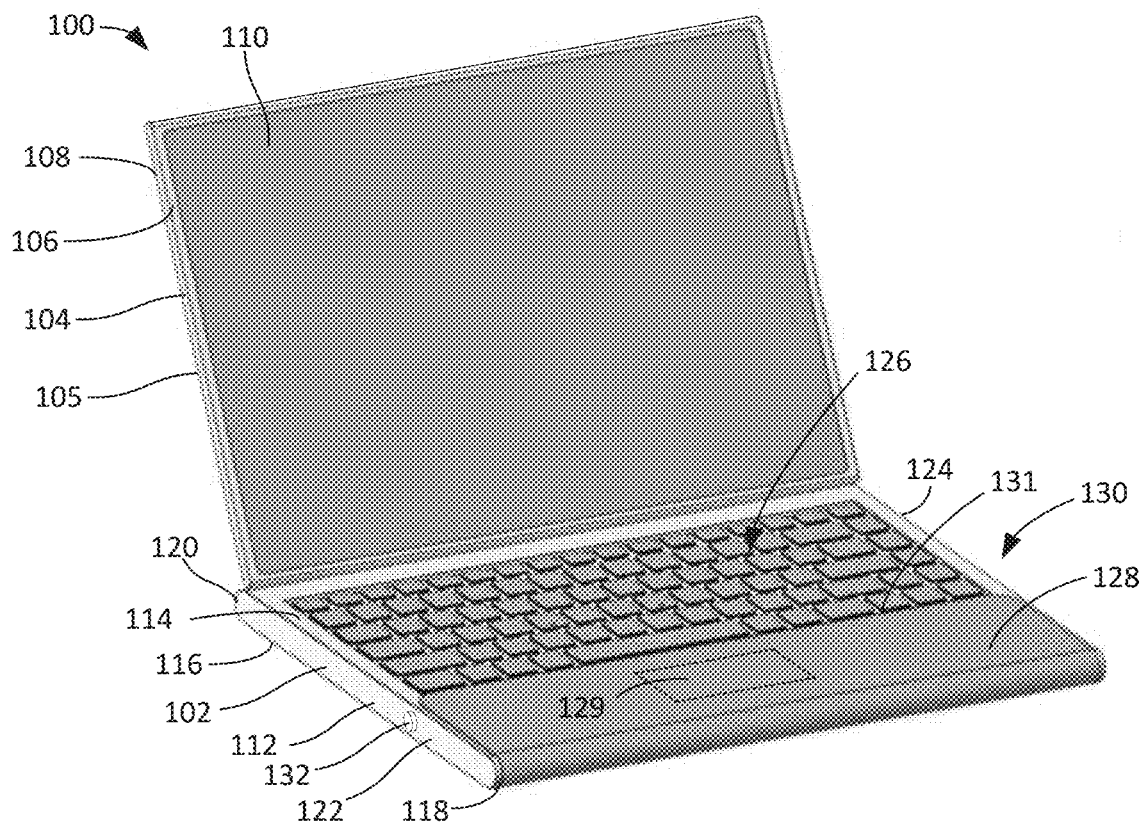
FIG. 1 is a perspective view of an example electronic device including an example base with an example fixed display screen and an example moveable display screen.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Many users prefer to use electronic devices having two displays, known as dual display systems or devices. Dual display devices can have many form factors, such as a laptop computer form factor. Known dual display laptop computers have a first screen on the lid portion and a second screen on the base portion. However, these known dual display devices typically do not include a physical keyboard. Instead, one or both of the display screens are a virtual keyboard (e.g., a display screen representing keys but not including physically separate, individually depressible keys).

Many users still desire the feeling of a traditional physical or mechanical keyboard. Therefore, users are required to utilize an external keyboard that can be plugged into or temporary attached to known laptop computers exhibiting the known dual screen approach. However, external keyboards require complicated attachment mechanisms and software applications. Further, external keyboards must be carried with the laptop computers and may be misplaced or lost. Also, some external keyboards are battery powered and require frequent charging. Additionally, if attached to the laptop computer, the addition of the keyboard increases the overall height or thickness of the laptop. Further, connecting the keyboard requires additional action that can become a nuisance and, thus, negatively impacts the user's experience with the laptop computer.

Disclosed herein are example electronic devices that address some or all of the above and/or other drawbacks. Disclosed herein are example electronic devices with moveable display screens. Examples disclosed herein enable an electronic device to incorporate or carry a physical keyboard as part of the electronic device and also allow the electronic device to transition between display screen area sizes to expose and/or cover a physical keyboard and/or other input device. Examples disclosed herein can be implemented in connection with dual display devices.

An example electronic device disclosed herein is a laptop computer including a lid with a first display screen and a base including a housing and a physical or mechanical keyboard carried by the housing. The base also includes a second display screen that is moveable between a fully exposed position and a stored position in which some or all of the moveable display screen is stored within and/or behind the housing of the base. In some examples, the first display screen is not moveable. In other examples, both display screens are moveable. In some examples, the second display screen is flexible. The second display screen can be partially disposed in the housing of the base and partially disposed outside of the housing of the base and along a portion of the top side of the housing of the base. The second display screen is moveable between a first position in which the keyboard is exposed (e.g., at least partially exposed) on the top side of the housing of the base but not covering the keyboard, and at least a second position in which the second display screen covers some or all of the keyboard on the top side of the housing of the base. As such, in the second position, the second display screen covers a relatively large area of the housing of the base and can operate as a second display screen in conjunction with the first display screen. Therefore, the electronic device can operate between a first mode (sometimes referred to as a keyboard mode) in which the keyboard is exposed and accessible, and a second mode (sometimes referred to as a non-keyboard mode or a dual display mode) in which the second display screen covers the keyboard on the top side of the base. In both modes, the second display screen can be activated and used. However, in the second mode, the second display screen has a greater viewing area.

In some examples, when the second display screen is in the first position, a first portion of the second display screen is disposed outside of the housing of the base, and a second portion of the display screen is disposed inside the housing of the base. In some examples, the housing of the base includes a slot, and the second display screen is moveable into/out of the housing through the slot. In some examples, the slot is defined in a bottom side of the housing near a front edge of the. In some examples the first portion of the second display screen (which is exposed) can operate as a trackpad and/or to display media (e.g., content, advertisements, a GUI to invoke utility of the computer, etc.) while the second display screen is in the first position. When the second display screen is moved to the second position, the second display screen is moved out of the inside of the housing and slid across the top side of the housing to cover the keyboard.

In some examples, when the second display screen is in the first position, the second portion of the display screen is at least partially wrapped around a roller in the housing. When the second display screen is moved to the second position, the roller rotates to unwrap the second display screen and allow the second display screen to move through the slot in the housing (e.g., at or near the front edge of the housing). Therefore, the second display screen may be a rollable flexible display screen.

Examples disclosed herein enable an electronic device such as a laptop computer to maintain a traditional form factor (e.g., a base with a keyboard and a lid with a first display screen (e.g., a fixed display screen)), while benefiting from an additional screen that can be selectively deployed between a fully exposed position, a partially exposed position(s), and a fully retracted position. Thus, users get the benefit of the physical keyboard, which is often desired for the feel during heavy typing tasks, but also the option of utilizing the functionality of a dual display device. Further, because the keyboard remains attached or integrated with the electronic device, examples disclosed herein eliminate the risk of losing or misplacing an external keyboard. Further, the keyboard does not need to be frequency recharged, as in know dual display laptop computers. Also, the transition between the first position (the first mode) and the second position (the second mode) is simpler and requires less steps than attaching an external keyboard as seen in know dual display laptop computers, thereby improving the user's experience with the electronic device.

FIG. 1 illustrates an example electronic device 100 constructed in accordance with the teachings of this disclosure. In the illustrated example, the electronic device 100 is a laptop computer. However, in other examples, the electronic device 100 can be implemented as another type of electronic device, such as a smartphone, a tablet, etc.

In the illustrated example of FIG. 1, the electronic device includes a base 102 (a first portion) and a lid 104 (a second portion) that are moveably coupled (e.g., hingedly coupled). The lid 104 can also be referred to as a top. The base 102 and the lid 104 may together form a clamshell housing. The lid 104 includes a housing 105, referred to herein as the lid housing 105, having a first side 106, referred to herein as a front side 106, and a second side 108, referred to herein as a back side 108, opposite the front side 106. In the illustrated example, the lid 104 has a first display screen 110 on the front side 106. The first display screen 110 can be any type of display screen, such a liquid crystal display (LCD) screen, a light-emitting diode (LED) display screen, an organic light emitting diode (OLED) display screen, or a plasma display screen.

In the illustrated example of FIG. 1, the base 102 includes a housing 112, referred to herein as the base housing 112. The base housing 112 has a first side 114, referred to herein as a top side 114, and a second side 116, referred to herein as a bottom side 116, opposite the top side 114. The base housing 112 also has a first edge 118, referred to herein as a front edge 118, a second edge 120, referred to herein as a rear edge 120, opposite the front edge 118, a third edge 122, referred to herein as a left edge 122, and a fourth edge 124, referred to herein as a right edge 124, opposite the left edge 122. The base housing 112 can be constructed of metal (e.g., aluminum), plastic, and/or any other material or combination of materials. In some examples, the base housing 112 contains electrical components of the electronic device 100. For example, the base housing 112 may contain processor circuitry (e.g., a central processing unit (CPU), a graphics processing unit (GPU), processor core(s), etc.), one or more storage devices (e.g., solid state memory), one or more batteries, one or more cooling devices (e.g., fans), and/or other hardware and/or circuitry.

In this example, the lid 104 is pivotably coupled to the base housing 112 along the rear edge 120 of the base housing 112. The lid 104 can be rotated between an open position, shown in FIG. 1, in which the lid 104 is angled relative to the base 102, and a closed position in which the front side 106 of the lid 104 is adjacent and/or engaged with the top side 114 of the base housing 112. In some examples, the electronic device 100 is a convertible computer. As such, the lid 104 can be pivoted or rotated 360° or nearly 360° (e.g., ±5°) around, such that the back side 108 of the lid 104 is adjacent and/or engaged with the bottom side 116 of the base housing 112 of the base 102.

In the illustrated example of FIG. 1, the base 102 includes a mechanical or physical keyboard 126 (e.g., with depressible keys/buttons) on the top side 114 of the base housing 112. The keyboard 126 is integrated and/or otherwise fixedly attached to the top side 114 of the base housing 112. The keyboard 126 includes one or more buttons that can be depressed (e.g., at least 1 millimeter). The keyboard 126 enables a user to type and/or enter commands into the electronic device 100. In some examples, the keyboard 126 is a QWERTY keyboard. In some instances, mechanical or physical keyboards are preferred by users over virtual keyboards. The keyboard 126 can be accessed on the top side 114 of the housing 112 of the base 102.

In the illustrated example, the base 102 includes a second display screen 128. The second display screen 128 enables the electronic device 100 to operate as a dual display, which is sometimes preferred by users, such as when playing games, consuming media, working, etc. In some examples, at least a portion of the second display screen 128 can be disposed in the base housing 112 (as shown in further detail herein), and at least a portion of the second display screen 128 can be disposed on an outer surface of the base housing 112. In some examples, the second display screen 128 is flexible, which enables the second display screen 128 to move between various position and locations without damage. In some examples, the second display screen 128 includes at least one of an OLED display screen, a mini-LED display screen, or a micro-LED display screen. In other examples, the second display screen 128 can be implemented as another type of screen.

In some examples, the second display screen 128 is moveable relative to the base housing 112. In this example, the second display screen 128 is moveable between a first position 130, shown in FIG. 1, and a second position 200, shown in FIG. 2. When the second display screen 128 is in the first position 130, the keyboard 126 is exposed or at least partially exposed. The first position 130 may also be referred to as the stored or retracted position. When the second display screen 128 is in the first position 130, the electronic device 100 is operable in a keyboard mode (a first mode) in which the keyboard 126 is accessible and usable. When the second display screen 128 is in the second position 200, the second display screen 128 covers the keyboard 126. The second position 200 may also be referred to as the deployed or extended position. When the second display screen 128 is in the second position 200, the electronic device 100 is operable in a dual display mode (a second mode) in which two relatively large displays are usable by the user.

In the first position 130 shown in FIG. 1, the second display screen 128 covers a portion of the top side 114 of the base housing 112, but does not cover the keyboard 126. As such, a user has access to and can use the keyboard 126 as desired. In some examples, the portion of the second display screen 128 that is exposed is operable as a trackpad. For example, the second display screen 128 can be implemented as a touch screen (e.g., a capacitive touch screen). FIG. 1 shows an example trackpad area 129 on the second display screen 128 that can be designated as a trackpad. Additionally, because the trackpad area 129 is implemented on the second display screen 128, the trackpad area 129 can be moved to another location (e.g., closer to one of the edges), and/or the size of the trackpad area 129 can be changed, as desired by the user. As such, the electronic device 100 does not require a physical trackpad on the base housing 112, which reduces costs associated with the electronic device 100. Additionally or alternatively, while the second display screen 128 is in the first position 130, the second display screen 128 can be activated to display any type of information or media (e.g., videos, pictures, selectable icons, etc.). App developers can provide various applications for display on the portion of the second display screen 128 that is exposed in the first position 130.

Figure 2:
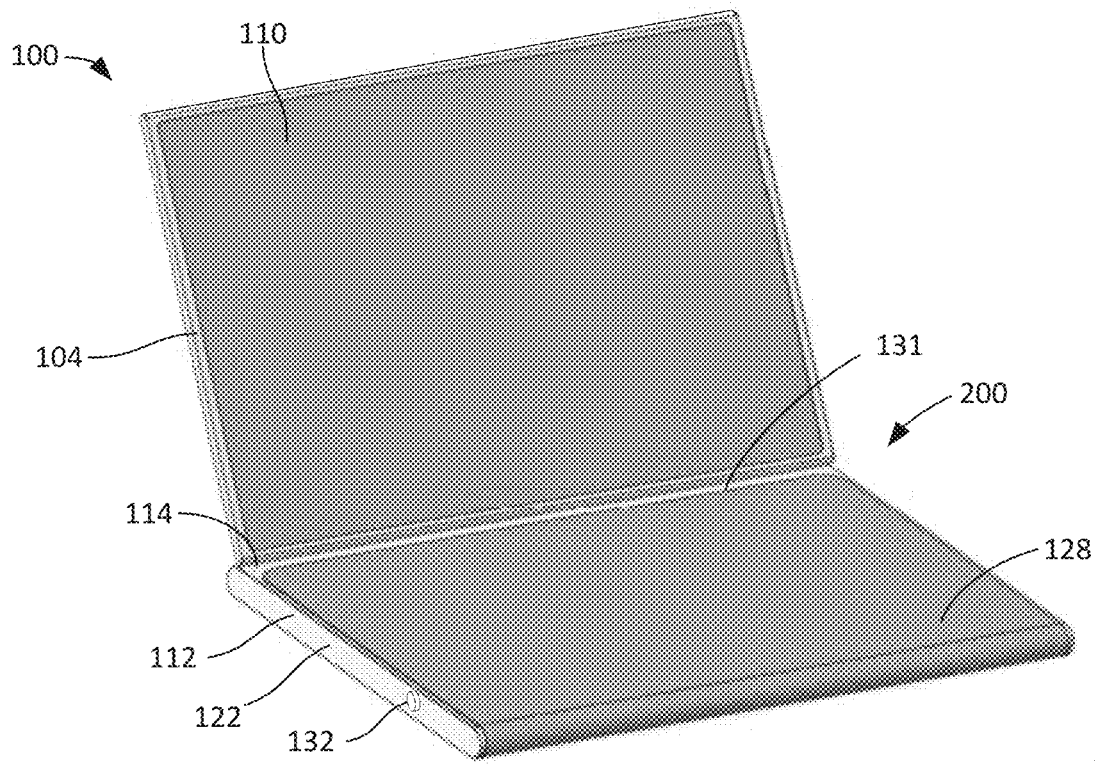
FIG. 2 is a perspective view of the example electronic device of FIG. 1 showing the example moveable display screen moved to a second position in which the example moveable display screen covers the example keyboard.

To transition from the first position 130 to the second position 200, the second display screen 128 can be slid along the top side 114 of the base housing 112 toward the lid 104, thereby covering the keyboard 126, as shown in the second position 130 in FIG. 2. When the second display screen 128 is in second position, a top edge 131 of the second display screen 128 is adjacent the lid 104. In this position, the second display screen 128 covers a substantial portion of the top side 114 of the base housing 112 and provides a relatively large viewing area. The second display screen 128 can be activated to display any type of media independent of or in conjunction with the first display screen 110. As a result, the electronic device 100 is transformable into a dual display device, which may be desirable for certain purposes by the user. If the user desires to use the keyboard 126, the second display screen 128 can be moved from the second position 200 back to the first position 130 shown in FIG. 1. In some examples, the second display screen 128 can be moved to any position between the first and second positions 130, 200. Therefore, the electronic device 100 has the benefits of an attached physical keyboard, but also the ability to operate as a dual display device.

In some examples, the second display screen 128 can be moved manually by the user to transition the second display screen 128 between the first and second positions 130, 200. For example, the user may manually grab and push/pull the second display screen 128. Additionally or alternatively, in some examples, the electronic device 100 includes an actuator to move the second display screen 128 from the first position 130 to the second position 200 and/or from the second position 200 to the first position 130. In some examples, the electronic device 100 includes a button 132 to activate the actuator. For example, the user can select (e.g., press) the button 132 a first time to activate the actuator to move the second display screen 128 from the first position 130 to the second position 200, and select the button 132 a second time to activate the actuator to move the second display screen 128 from the second position 200 to the first position 130. In the illustrated example of FIGS. 1 and 2, the button 132 is on the left edge 122. However, in other examples, the button 132 can be disposed in another location.

FIG. 3 is a side view of the base 102 of the electronic device 100 (with the left edge 122 (FIG. 1) removed) and FIG. 4 is a perspective view of the base 102 of the electronic device 100 (with the left edge 122 (FIG. 1) removed). FIGS. 3 and 4 show the second display screen 128 in the first position 130. As such, the keyboard 126 is exposed on the top side 114 of the base housing 112. In the illustrated example of FIG. 3, the electronic device 100 includes a circuit board 300 and a battery 302 in the base housing 112 of the base 102. The circuit board 300 can be implemented as the motherboard (e.g., a logic circuit, a printed circuit board (PCB), etc.) of the electronic device 100 and can include one or more circuitry components. The battery 302 provides power to the electrical components of the electronic device 100.

As shown in FIGS. 3 and 4, the base housing 112 has a slot 304 (e.g., an opening) to enable the second display screen 128 to move into and out of the base housing 112. In this example, the slot 304 is formed in the bottom side 116 of the base housing 112 adjacent the front edge 118. The slot 304 may traverse or extend substantially across the width of the base housing 112 from the left edge 122 (FIG. 1) to the right edge 124 (FIG. 1). In other examples, the slot 304 can be disposed in other locations (e.g., on the front edge 118, on the top side 114, etc.).

As shown in FIGS. 3 and 4, the second display screen 128 is at least partially disposed in the base housing 112 and extends outward through the slot 304. When the second display screen 128 is in the first position 130, a first portion 306 of the second display screen 128 is disposed outside of the base housing 112, and a second portion 308 of the second display screen 128 is disposed inside the base housing 112. In the illustrated example, the first portion 306 of the second display screen 128 is disposed along the top side 114 of the base housing 112 and the front edge 118 of the base housing 112. In some examples, when the second display screen 128 is in the first position 130, the first portion 306 of the second display screen 128 is to operate as a trackpad.

In the illustrated example, the base 102 includes a roller 310 (e.g., a rotatable rod) in the base housing 112. In some examples, the roller 310 extends between the inner surfaces of the left edge 122 and/or the right edge 124 (FIGS. 1 and 2) of the base housing 112). The roller 310 is rotatable. When the second display screen 128 is in the first position 130, the second portion 308 of the second display screen 128 is wrapped around the roller 310. As disclosed above, the second display screen 128 can be a flexible display screen. Therefore, the second display screen 128 can be wrapped around the roller 310 without damaging the second display screen 128. In some examples, a bottom edge of the second display screen 128 is coupled to the roller 310. When the second display screen 128 is moved to the second position (FIG. 2), the roller 310 rotates, thereby unwinding the second portion 308 of the second display screen 128, which enables the second portion 308 of the second display screen 128 to move through the slot 304. In this example, the roller 310 is disposed adjacent the front edge 118 of the base housing 112. However, in other examples, the roller 310 can be disposed in other locations in the base housing 112. In some examples, the roller 310 is spring loaded to bias the second display screen 128 to the first position 130. Therefore, when the second display screen 110 is moved from the second position to the first position 130, the roller 310 rotates to wrap the second portion 308 of the second display screen 128 around the roller 310. In some examples, the roller 310 advantageously enables the second portion 308 of the second display screen 128 to be neatly and compactly arranged in the base housing 112 so as not to interfere with other parts or components in the base housing 112.

In some examples, the diameter of the roller 310 is selected based on the flexibility of the second display screen 128. In some examples, the roller 310 is to have a minimum diameter (e.g., 3 millimeters) to ensure the second display screen 128 is not curved too tight and cause damage to the second display screen 128. In some examples, the base housing 112, the second display screen 128, and the roller 310 are sized such that when the second portion 308 for the second display screen 128 is wrapped around the roller 310 in the base housing 112, an air gap (e.g., 0.5 mm) is formed between the outer layer of the second display screen 128 and the inner surfaces of the top and bottom sides 114, 116 of the base housing 112. This ensures the second display screen 128 does not rub against the inner surfaces of the base housing 112. This also ensures sufficient air flow through the base housing 112 to reduce overheating.

FIGS. 5 and 6 are the same views as FIGS. 3 and 4, respectively, and show the second display screen 128 in the second position 200. As shown in FIGS. 5 and 6, the second display screen 128 covers the keyboard 126 on the top side 114 of the base housing 112. The second portion 308 (FIGS. 3 and 4) of the second display screen 128 has been moved outward through the slot 304 and covers the front edge 118 and the top side 114 of the base housing 112. As shown in FIG. 5, the second display screen 128 moves a distance D1 between the first position 130 and the second position 200. The second display screen 128 can also be moved to any position between the first position 130 and the second position 200 (and/or any position beyond the first position 130 and the second position 200). For example, the second display screen 128 can be moved to a position where the second display screen 128 covers only a portion of the keyboard 126.

Figure 7:
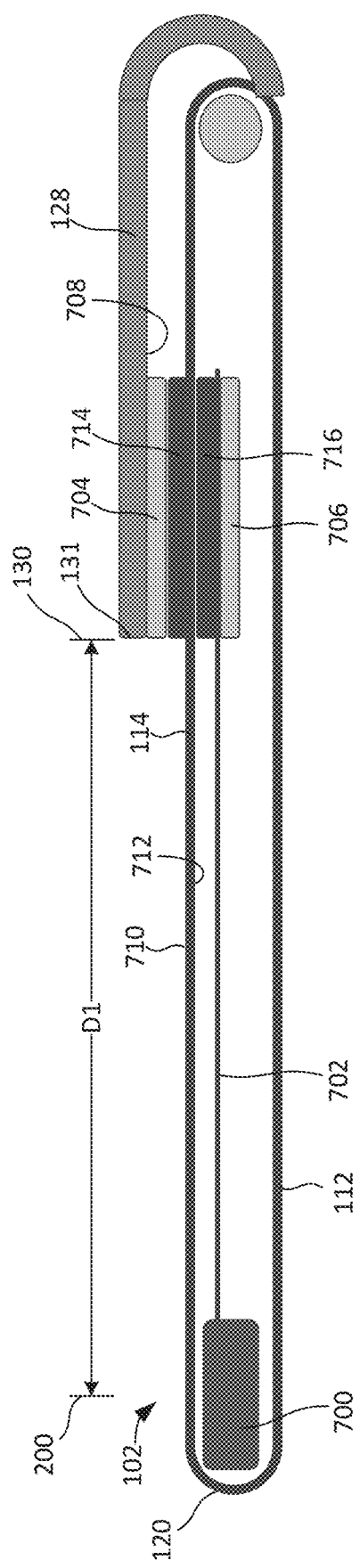
FIG. 7 illustrates an example actuator that can be used in the example electronic device of FIG. 1 to move the example moveable display screen.

FIG. 7 illustrates an example actuator 700 that can be used to move the second display screen 128 between the first and second positions 130, 200. In the illustrated example, the actuator 700 is disposed in the base housing 112 of the base 102. In this example, the actuator 700 is a linear actuator having an extendable/retractable rod 702. In the illustrated example, the base 102 includes a first magnetic element 704 and a second magnetic element 706. As used herein, the term "magnetic element" can include a magnet or a material that is attracted/repelled and/or otherwise affected by a magnet, such as a piece of metal (e.g., iron). The first magnetic element 704 is coupled to a back side 708 of the second display screen 128 adjacent the top edge 131 of the second display screen 128. The first magnetic element 704 is disposed between the second display screen 128 and an outer surface 710 of the top side 114 of the base housing 112. The second magnetic element 706 is disposed in the base housing 112 adjacent an inner surface 712 of the top side 114 of the base housing 112, opposite of the first magnetic element 704. The first magnetic element 704 is magnetically attracted to the second magnetic element 706. The actuator 700 is coupled to the second magnetic element 706. In particular, in this example, the second magnetic element 706 is coupled to the rod 702 of the actuator 700. The actuator 700 can be activated to move the second magnetic element 706 linearly along the inner surface 712 of the top side 114 of the base housing 112. For example, the actuator 700 can be activated to move the second magnetic element 706 toward the rear edge 120 of the base housing 112 (to the left in FIG. 7). This pulls the first magnetic element 704 toward the rear edge 120 of the base housing 112, thereby moving the second display screen 128 over the keyboard 126 (FIG. 1) to the second position 200. Therefore, the actuator 700 can move the second magnetic element 706 to thereby move the first magnetic element 704 and the second display screen 128 from the first position 130 to the second position 200. Conversely, the actuator 700 can be activated to move the second magnetic element 706 in the opposite direction (to the right in FIG. 8) to move the second display screen 128 back to the first position 130.

In some examples, the base 102 includes one or more pads to enable the magnetic elements 704, 706 to slide smoothly along the top side 114 of the base housing 112. For example, as shown in FIG. 7, the base 102 includes a first pad 714 coupled to the first magnetic element 704 and disposed between the first magnetic element 704 and the outer surface 710 of the top side 114 of the base housing 112. The first pad 714 facilitates sliding of the first magnetic element 704 along the top side 114 of the base housing 112. Similarly, a second pad 716 is coupled to the second magnetic element 706 and disposed between the second magnetic element 706 and the inner surface 712 of the top side 114 of the base housing 112. The second pad 716 facilitates sliding of the second magnetic element 706 along the top side 114 of the base housing 112. In some examples, the first and second pads 714, 716 are constructed of Polytetrafluoroethylene (Teflon™). In other examples, the first and second pads 714, 716 can be constructed of other materials and/or combinations of materials.

In some examples, the first and second magnetic elements 704, 706 are disposed near a left edge of the second display screen 128 so as not to interfere with the keyboard 126. For example, the first and second magnetic elements 704, 706 can move or slide along the narrow portion of the top side 114 of the base housing 112 between the keyboard 126 and the left edge 122 of the base housing 112. In some examples, another pair of magnets is used on the right edge of the second display screen 128. In some examples, the same actuator (e.g., the actuator 700) operates to move both magnets. In other examples, a second or separate actuator can be used to move the magnet near the right edge.

Figure 8:
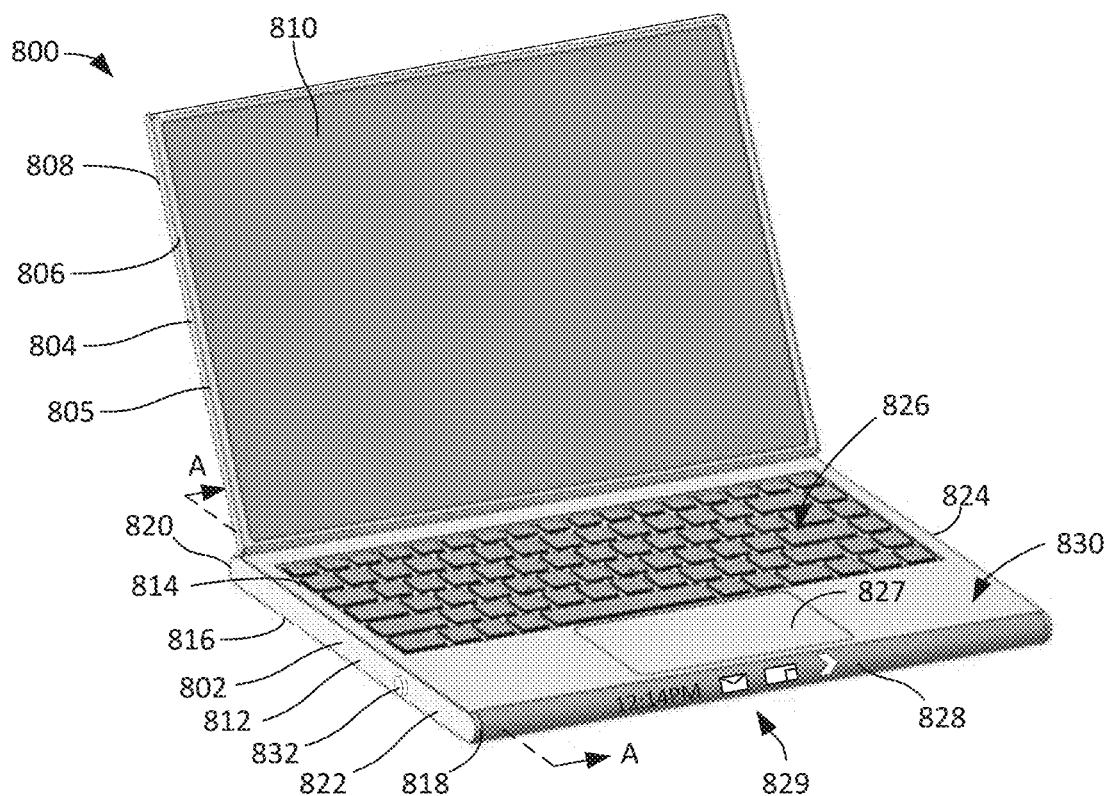
FIG. 8 is a perspective view of another example electronic device including an example lid with an example fixed display screen an example base with an example moveable display screen.

FIG. 8 illustrates another example electronic device 800 in which examples disclosed herein can be implemented. In the illustrated example, the electronic device 800 is a laptop computer. However, in other examples, the electronic device 800 can be implemented as another type of electronic device, such as a smartphone, a tablet, etc.

The example electronic device 800 includes a base 802 (a first portion) and a lid 804 (a second portion) that are moveably coupled (e.g., hingedly coupled). The base 802 and the lid 804 are substantially similar as the base 102 and the lid 104 of the electronic device 100 disclosed above. As such, any of the example structural and/or functional features disclosed in connection with the base 102 and the lid 104 can likewise apply to the base 802 and the lid 804, respectively. As shown in FIG. 8, the lid 804 includes a lid housing 805 having a front side 806, a back side 808 opposite the front side 806, and a first display screen 810 on the front side 806. The base 802 includes a base housing 812, which has a top side 814, a bottom side 816, a front edge 818, a rear edge 820, a left edge 822, and a right edge 824. In the illustrated example of FIG. 8, the base 802 includes a mechanical or physical keyboard 826 on the top side 814 of the base housing 812. Further, in this example, the base 802 includes a trackpad 827, which is disposed between the keyboard 826 and the front edge 818 of the base housing 812.

In the illustrated example, the electronic device 800 includes a second display screen 828. In some examples, the second display screen 828 is moveable relative to the base housing 812. In some examples, the second display screen 128 is flexible, which enables the second display screen 128 to move between various position and locations without damage. In this example, the second display screen 828 is moveable between a first position 830, shown in FIG. 8, and a second position 900, shown in FIG. 9. When the second display screen 828 is in the first position 830, the keyboard 826 and the trackpad 827 are exposed. As such, the electronic device 800 is operable in a keyboard mode (a first mode) in which the keyboard 826 and the trackpad 827 are usable by the user. When the second display screen 828 is in the second position 900, the second display screen 828 covers the keyboard 826 and the trackpad 827. In this position, the electronic device 800 is operable in a dual display mode (a second mode).

In the first position 830 shown in FIG. 8, the second display screen 828 covers the front edge 818 of the base housing 812, but does not cover the keyboard 826 or the trackpad 827. As such, a user has access to and can use the keyboard 826 and/or the trackpad 827 as desired. In some examples, the portion of the second display screen 828 that is exposed along the front edge 818 can display information 829 along the front edge 818 of the base housing 812, such as the time, email previews, calendar reminders, the weather, pictures, etc.

Figure 9:
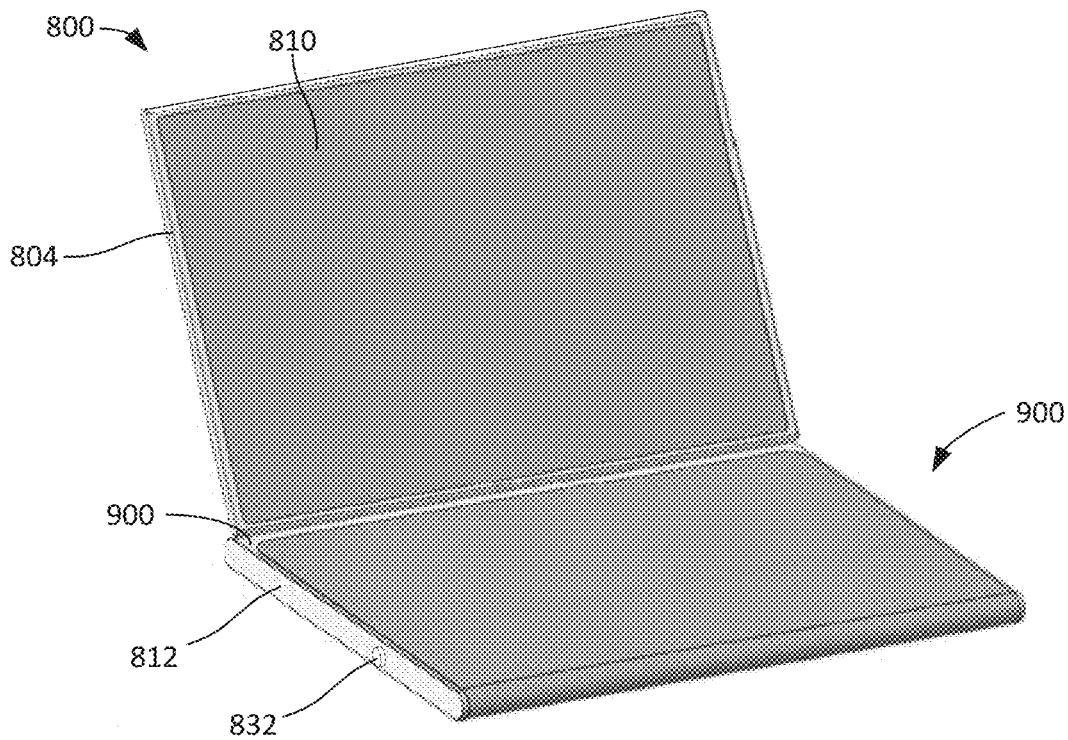
FIG. 9 is a perspective view of the example electronic device of FIG. 8 showing the example moveable display screen moved to a second position in which the example moveable display screen covers the example keyboard and the example trackpad.

To transition from the first position 830 to the second position 900, the second display screen 828 can be slid along the top side 814 of the base housing 812 toward the lid 804, thereby covering the keyboard 826 and the trackpad 827, as shown in the second position 900 in FIG. 9. In the second position 900, the second display screen 828 covers a substantial portion of the top side 814 of the base housing 812 and provides a relatively large viewing area. The second display screen 828 can be activated to display any type of media independent of or in conjunction with the first display screen 810. As a result, the electronic device 800 is transformable into a dual display device, which may be desirable for certain purposes by the user. If the user desires to use the keyboard 826 and/or the trackpad 827, the second display screen 828 can be moved from the second position 900 back to the first position 830 shown in FIG. 8. Therefore, the electronic device 100 has the benefits of an attached physical keyboard, but also the ability to operate as a dual display device.

In some examples, the second display screen 828 can be moved manually by the user to transition the second display screen 828 between the first and second positions 830, 900. Additionally or alternatively, in some examples, the electronic device 800 includes an actuator to move the second display screen 828 from the first position 830 to the second position 900 and/or from the second position 900 to the first position 830. For example, the electronic device 800 can include the actuator 700 and associated components disclosed in connection with FIG. 7. In some examples, the electronic device 100 includes a button 832 to activate the actuator.

FIG. 10 is a side view cross-sectional view of the base 802 of the electronic device 800 taken along line A-A of FIG. 8, and FIG. 11 is a perspective cross-sectional view of the base 802 of the electronic device 800 taken along line A-A of FIG. 8. FIGS. 10 and 11 show the second display screen 828 in the first position 830. As such, the keyboard 826 and the trackpad 827 (FIG. 8) are exposed. In the illustrated example of FIG. 10, the electronic device 800 includes a circuit board 1000 and a battery 1002 in the base housing 812 of the base 802.

As shown in FIGS. 10 and 11, the base housing 812 has a slot 1004 (e.g., an opening) to enable the second display screen 828 to move into and out of the base housing 812. In this example, the slot 304 is formed in the bottom side 816 of the base housing 812 adjacent the front edge 818. The slot 1004 may traverse or extend substantially across the width of the base housing 812 from the left edge 822 (FIG. 8) to the right edge 824 (FIG. 8). In other examples, the slot 1004 can be disposed in other locations (e.g., on the front edge 818, on the top side 814, etc.).

As shown in FIGS. 10 and 11, the second display screen 828 is at least partially disposed in the base housing 812 and extends outward through the slot 1004. When the second display screen 828 is in the first position 830, a first portion 1006 of the second display screen 828 is disposed outside of the base housing 812, and a second portion 1008 of the second display screen 828 is disposed inside the base housing 812. In the illustrated example, the first portion 1006 of the second display screen 828 is disposed along the front edge 818 of the base housing 812. The first portion 1006 can display various information 829 (FIG. 8), such as icons, text, etc. when the second display screen 828 is in the first position 830.

In the illustrated example, the base 802 includes a roller 1010 (e.g., a rotatable rod) in the base housing 812. In some examples, the roller 1010 extends between the inner surfaces of the left edge 822 (FIG. 8) and/or the right edge 824 (FIG. 8) of the base housing 812. The roller 1010 is rotatable. In the illustrated example, the roller 1010 is disposed adjacent the rear edge 820 of the base housing 812. In this example, the base 802 includes a belt 1012 (e.g., non-display material) coupled to an edge 1014 of the second display screen 828.

When the second display screen 828 is in the first position 830, as shown in FIGS. 10 and 11, the second portion 1008 of the second display screen 828 extends along the bottom side 816 of the base housing 812 from the slot 1006 to the roller 1010, and the belt 1012 is wrapped around the roller 1010. In some examples, when the second display screen 828 is in the first position 830, none of the second display screen 828 is wrapped around the roller 1010. Instead, the base housing 812 provides sufficient linear space for the second display screen 828. In other examples, a portion of the second display screen 828 can be wrapped around the roller 1010 when in the first position 830. When the second display screen 128 is moved to the second position 900 (FIG. 9), the roller 1010 rotates, thereby unwinding the belt 1012 (and, in some examples, a portion of the second display screen 828) as the second portion 1008 of the second display screen 828 moves through the slot 1004. In some examples, the roller 1010 is spring loaded to bias the second display screen 828 to the first position 830. As such, when the second display screen 828 is moved from the second position 900 to the first position 830, the roller 1010 rotates to wrap the belt 1012 (and/or a portion of the second display screen 828) around the roller 1010.

In some examples, by disposing the roller 1010 in the base housing 812 opposite of the slot 1006, less of the second display screen 828 (if any) is wrapped around the roller 1010 when the second display screen 828 is in the first position 830. This reduces the diameter and, thus, the space consumed by the roller 1010 and the material layers in the base housing 812. In the illustrated example, the belt 1012 extends from the edge 1014 of the second display screen 828 near the left edge. In some examples another belt is similarly coupled to the edge 1014 of the second display screen 828 near the right edge and similarly wraps around the roller 1010.

In the illustrated example, the base 102 includes a first guide wheel 1016 disposed near the front edge 818 and a second guide wheel 1018 disposed near the rear edge 820. The first and second guide wheels 1016, 1018 help guide the second display screen 828 through the base housing 812 and along the bottom side 816 so as not to interfere with other parts or components in the base housing 812. In some examples, the first and second guide wheels 1016, 1018 are rotatable. In other examples, the first and second guide wheels 1016, 1018 are not rotatable, and the second display screen 828 merely slides on the first and second guide wheels 1016, 1018.

Figure 12:
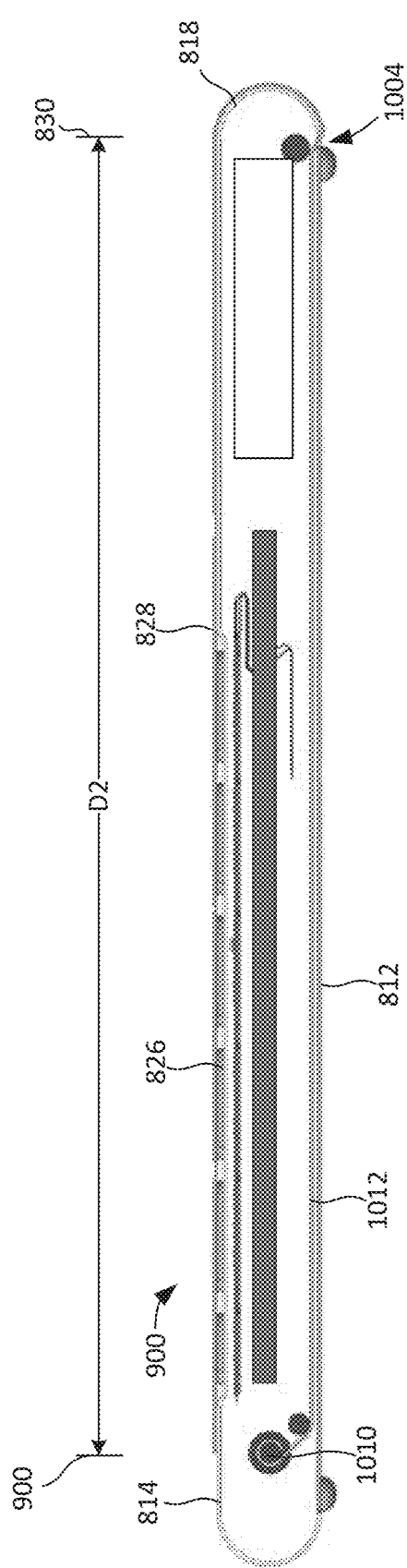
FIG. 12 is a side view of the example electronic device of FIG. 8 with the example moveable display screen in the second position.
Figure 13:
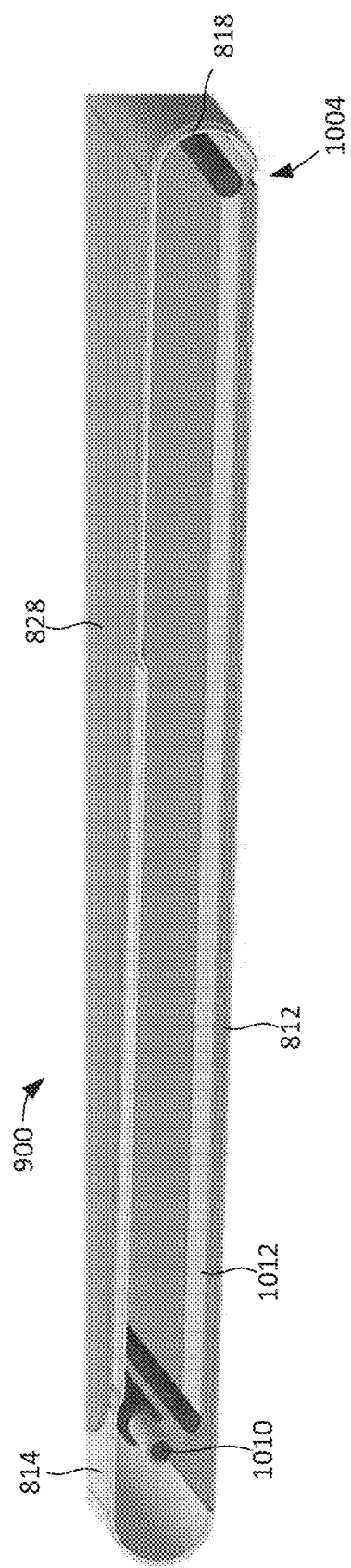
FIG. 13 is a perspective side view of the example electronic device of FIG. 8 with the example moveable display screen in the second position.

FIGS. 12 and 13 are the same views as FIGS. 10 and 11, respectively, and show the second display screen 828 in the second position 900. As shown in FIGS. 12 and 13, the second display screen 828 covers the keyboard 826 and the trackpad 827 (FIG. 8) on the top side 814 of the base housing 812. The belt 1012 has been unwound from the roller 1010, and the second portion 1008 (FIG. 10) of the second display screen 828 has been moved outward through the slot 1004 and covers the front edge 818 and the top side 814 of the base housing 812. As shown in FIG. 12, the second display screen 128 moves a distance D2 between the first position 830 (FIGS. 10 and 11) and the second position 900. In this example, D2 is greater than D1 shown in FIG. 5.

In the example electronic devices 100, 800 of FIGS. 1 and 8, at least a portion of the second display screen 128, 828 is exposed in the first position 130, 830. However, in other examples, the second display screen 128, 828 can be entirely hidden or stowed in the first position 130, 830, such that none of the second display screen 128, 828 is viewable.

Figure 14:
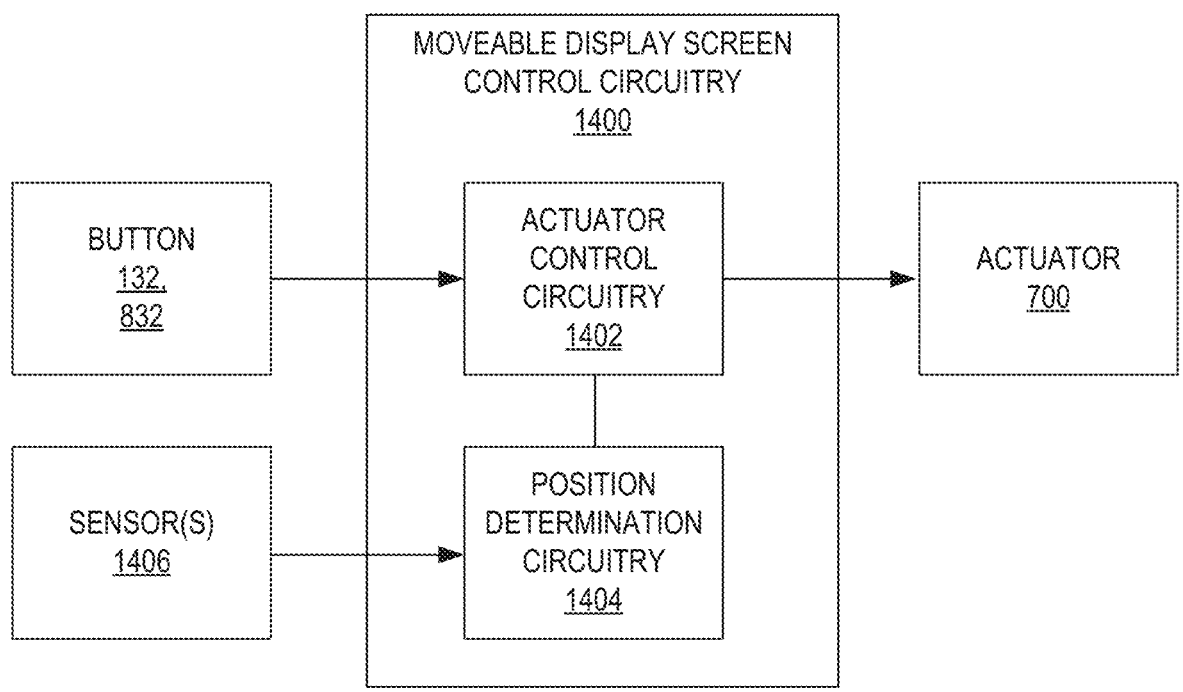
FIG. 14 is a block diagram of an example moveable display screen control circuitry that can be implemented in the example electronic device of FIG. 1 or the example electronic device of FIG. 8 to control movement of the example moveable display screen.

FIG. 14 is a block diagram of an example moveable display screen control circuitry 1400 that can be implemented in the electronic devices 100, 800 to control the second display screens 128, 828. The moveable display screen control circuitry 1400 can be implemented by a processor (e.g., the processor 1612 of the example processor platform 1600 disclosed in connection with FIG. 16) of the electronic devices 100, 800.

In the illustrated example, the moveable display screen control circuitry 1400 includes an actuator control circuitry 1402 for controlling (e.g., activating and deactivating the actuator 700). In some examples, the actuator control circuitry 1402 controls the actuator 700 based on command signals from the button 132, 832.

In some examples, the moveable display screen control circuitry 1400 includes a position determination circuitry 1404 to determine the position or location of the second display screen 128, 828. In some examples, the position determination circuitry 1404 determines the position based on signals from one or more sensor(s) 1406. In some examples, the sensor(s) 1406 are feedback sensors integrated in the actuator 700. For example, the actuator 700 may be implemented as a servomotor. Additionally or alternatively, the sensor(s) 1406 can be coupled to any of the other components, such as the roller 310, 1010, the display screen 128, 828, etc. The sensor(s) 1406 can include a gyrometer, an accelerometer, a Hall Effect sensor, and/or any other type of sensor capable of detecting position and/or movement. For example, the sensor(s) 1406 can include a magnet on the second display screen 128, 828 (e.g., near the top edge 131) and Hall Effect sensors near the limit positions (e.g., the first position 130, 830 and/or the second position 200, 900). The Hall Effect sensors can sense the magnet and, thus, detect when the second display screen 128 has reached a limit position. In another example, the sensor(s) 1406 can detect a voltage spike in the motor of the actuator 700, which may occur when the second display screen 128, 828 reaches one of the limit positions. Based on the position of the second display screen 128, 828, the actuator control circuitry 1402 can activate the actuator 700 in one direction and cease activation of the actuator 700 when the second display screen 128, 828 reaches a desired position.

While in the electronic devices 100, 800 of FIGS. 1 and 8 the second display screen 128, 828 is deployed and/or retracted from the bottom side 116, 816 and along the front edge 118, 818 of the base housing 112, 812, in other examples, the second display screen 128, 828 can be deployed and/or retracted from another side or edge of the base housing 112, 812. For example, the slot 304, 1004 in the base housing 112, 812 can be located along the bottom side 116, 816 near one of the side edges 122, 124, 822, 824, or along one of the side edges 122, 124, 822, 824, such that the second display screen 128, 828 moves sideways across the top side 114, 814 of the base housing 112, 812.

Also, while the example moveable display screens are described in connection with electronic devices for dual display systems, the examples disclosed herein can also be implemented in connection with other types of electronic devices not having dual displays or a laptop computer form factor. For example, an electronic device such as a smartphone or handheld tablet can have a housing with a physical keyboard and a display screen on a portion of the housing. The portion of the display screen that is exposed can be used as a traditional screen, and the user can enter information and/or commands into the electronic device via the keyboard. If the user desires to increase the size of the screen (e.g., for watching a movie), the display screen can be moved from a first position in which the keyboard is exposed to a second position in which the display screen covers the keyboard, thereby increasing the size of the area of the display screen.

In another example, the electronic device can include a fixed display on the housing. In such examples, the moveable display screen can be deployed to increase the size of the display and/or provide a second display. For example, a smartphone or tablet can include a housing with a first fixed display and a keyboard on a top size of the housing. The smartphone or tablet can have a second display screen that is moveable over the keyboard, similar to the moveable display screens 128, 828 disclosed herein. The second display screen can be moved between a first position in which the keyboard is exposed and accessible, and a second position in which the second display screen covers the keyboard. In some examples, the second display screen is moved to a position near (e.g., abutting) the first display screen, such that the first and second display screens form a substantially continuous display screen. In such an example, the first and second display screens can be configured to operates as one uniform display screen. In other examples, the first and second display screens can be operated as two separate display screens.

While an example manner of implementing the moveable display screen control circuitry 1400 is illustrated in FIG. 14, one or more of the elements, processes, and/or devices illustrated in FIG. 14 may be combined, divided, re-arranged, omitted, eliminated, and/or implemented in any other way. Further, the example actuator control circuitry 1402, the example position determination circuitry 1404, and/or, more generally, the example moveable display screen control circuitry 1400 of FIG. 14, may be implemented by hardware, software, firmware, and/or any combination of hardware, software and/or firmware. Thus, for example, any of the example actuator control circuitry 1402, the example position determination circuitry 1404, and/or, more generally, the example moveable display screen control circuitry 1400, could be implemented by processor circuitry, analog circuit(s), or digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)) such as Field Programmable Gate Arrays (FPGAs)). When reading any of the apparatus or system claims of this patent to cover a purely software and/or firmware implementation, at least one of the example actuator control circuitry 1402 and/or the example position determination circuitry 1404 is/are hereby expressly defined to include a non-transitory computer readable storage device or storage disk such as a memory, a digital versatile disk (DVD), a compact disk (CD), a Blu-ray disk, etc., including the software and/or firmware. Further still, the example moveable display screen control circuitry 1400 of FIG. 14 may include one or more elements, processes and/or devices in addition to, or instead of, those illustrated in FIG. 14, and/or may include more than one of any or all of the illustrated elements, processes and devices.

Figure 15:
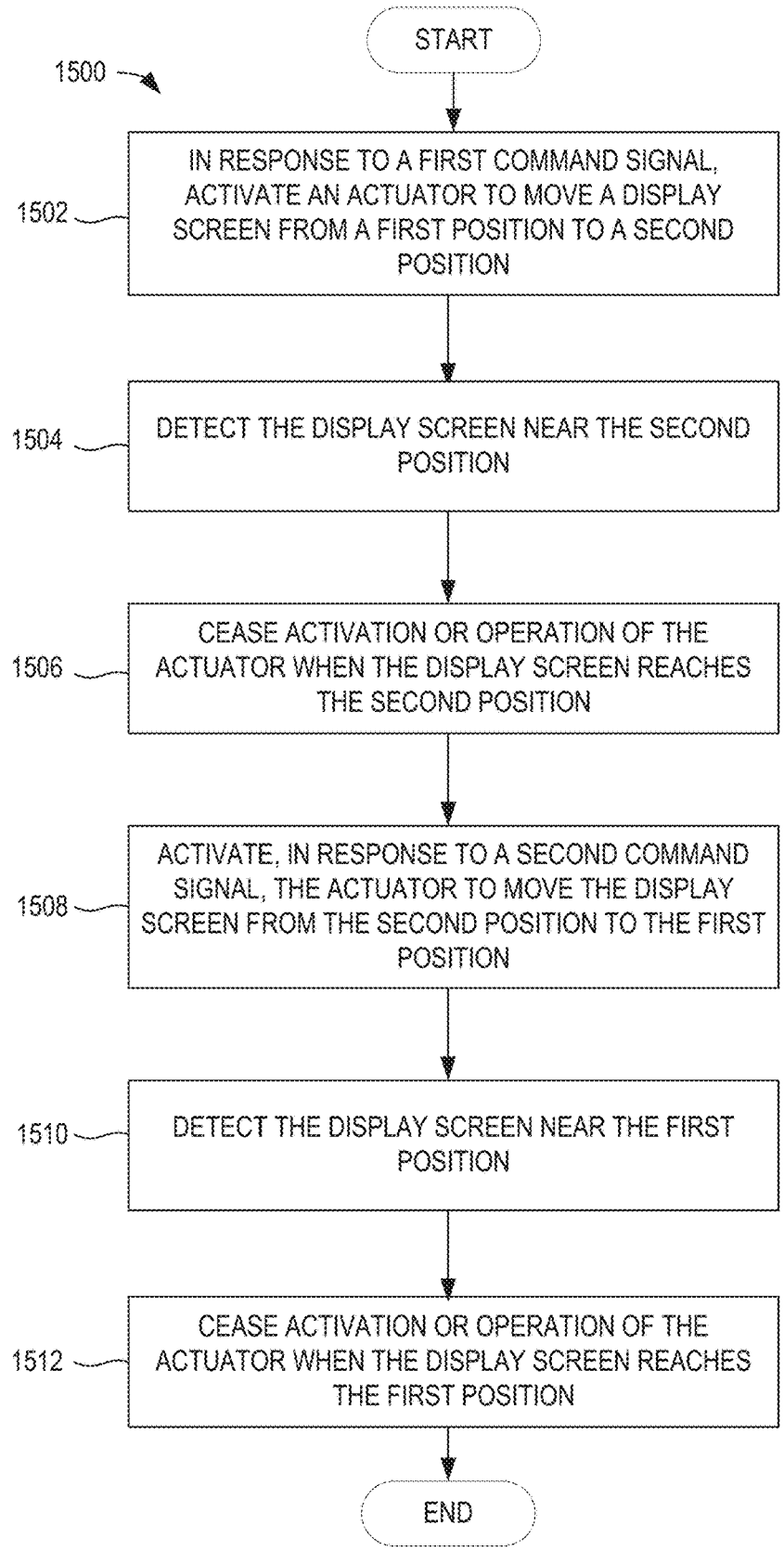
FIG. 15 is a flowchart representative of example machine readable instructions that can be executed by example processor circuitry to implement the example moveable display screen control circuitry of FIG. 14.

A flowchart representative of example hardware logic circuitry, machine readable instructions, hardware implemented state machines, and/or any combination thereof for implementing the moveable display screen control circuitry 1400 of FIG. 14 is shown in FIG. 15. The machine readable instructions may be one or more executable programs or portion(s) of an executable program for execution by processor circuitry, such as the processor 1612 shown in the example processor platform 1600 discussed below in connection with FIG. 16 and/or the example processor circuitry discussed below in connection with FIGS. 17 and/or 18. The program may be embodied in software stored on one or more non-transitory computer readable storage media such as a CD, a floppy disk, a hard drive disk (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 15, many other methods of implementing the example moveable display screen control circuitry 1400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 15 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 15 is a flowchart representative of example machine readable instructions and/or example operations 1500 that can be executed and/or instantiated by processor circuitry to implement the example moveable display screen control circuitry 1400 of FIG. 14. The example flowchart is described in connection with the electronic device 100 and the second display screen 128 disclosed in connection with FIGS. 1-7. However, the example flowchart can be similarly implemented in connection with the electronic device 800 and the second display screen 828 disclosed in connection with FIGS. 8-13.

At block 1502, the actuator control circuitry 1402 activates, in response to a first command signal, the actuator 700 to move the second display screen 128 (in a first direction) from the first position 130 to the second position 200. In some examples, the first command signal is generated by activation of a physical button, such the button 132. For example, when the user desires to use the electronic device 100 as a dual display device, the user can activate (e.g., press) the button 132, which generates the first command signal to activate the actuator 700. Additionally or alternatively, the first command signal can be generated by selection of an icon on the first display screen 110 and/or the second display screen 128 and/or input from another device (e.g., a mouse, a wireless remote, etc.).

While the second display screen 128 is moving from the first position 130 toward the second position 200, the position determination circuitry 1404 monitors the position or location of the second display screen 128. At block 1504, the position determination circuitry detects the display screen near the second position. The position determination circuitry 1404 communicates the position or location to the actuator control circuitry 1402. At block 1506, the actuator control circuitry 1402 ceases activation or operation of the actuator 700 when the second display screen 128 reaches the second position. In this position, the second display screen 128 covers the keyboard 126 on the top side 114 of the base housing 112 and, thus, covers a relatively large area on the top side 114 of the base housing 112. As such, the user can use the electronic device 100 as a dual display device.

If the user desires to use the keyboard 126, the user can activate the button 132 again and/or enter the command into the first display screen 110 and/or the second display screen 128 (and/or another device). At block 1508, the actuator control circuitry 1402 activates, in response to a second command signal, the actuator 700 to move the second display screen 128 (in a second direction) from the second position 200 to the first position 130. The position determination circuitry 1404 monitors the position or location of the second display screen 128. At block 1510, the position determination circuitry 1404 detects the display screen near the first position. At block 1512, the actuator control circuitry 1402 ceases activation or operation of the actuator 700 when the second display screen 128 reaches the first position 130. In this position, the second display screen 128 does not cover the keyboard 126. As such, the user has access to the keyboard 126. In some examples, the second display screen 128 can be operated as a trackpad when the second display screen 128 is in the first position. The example operation may end and/or may be repeated again at block 1502.

In other examples, the user may activate the actuator 700 and stop the actuator 700 when a desired position is reached. For example, the user may press the button 132 to activate the actuator 700. While the actuator 700 is moving the second display screen 128, the user can press the button 132 a second time, and the actuator control circuitry 1402 stops the actuator 700. Therefore, in some examples, no position detection occurs. Instead, the user determines when to start/stop the actuator.

Figure 16:
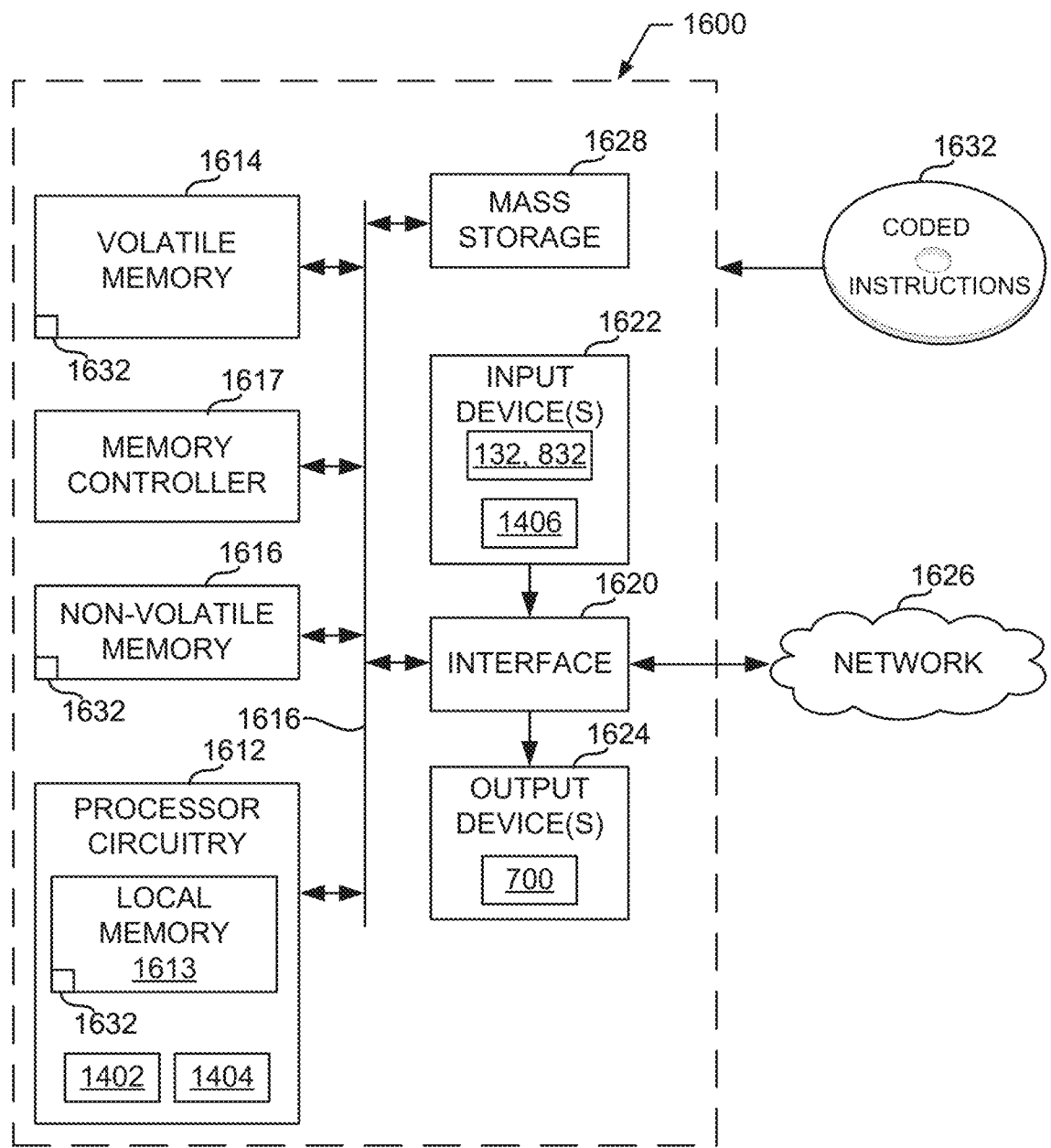
FIG. 16 is a block diagram of an example processing platform including processor circuitry structured to execute the example machine readable instructions of FIG. 15 to implement the example moveable display screen control circuitry of FIG. 14.

FIG. 16 is a block diagram of an example processor platform 1600 structured to execute and/or instantiate the machine readable instructions and/or operations of FIG. 15 to implement the moveable display screen control circuitry 1400 of FIG. 14. The processor platform 1600 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1600 of the illustrated example includes processor circuitry 1612. The processor circuitry 1612 of the illustrated example is hardware. For example, the processor circuitry 1612 can be implemented by one or more integrated circuits, logic circuits, FPGAs, microprocessors, CPUs, GPUs, DSPs, and/or microcontrollers from any desired family or manufacturer. The processor circuitry 1612 may be implemented by one or more semiconductor based (e.g., silicon based) devices. In this example, the processor 1612 implements the actuator control circuitry 1402 and the position determination circuitry 1404.

The processor circuitry 1612 of the illustrated example includes a local memory 1613 (e.g., a cache, registers, etc.). The processor circuitry 1612 of the illustrated example is in communication with a main memory including a volatile memory 1614 and a non-volatile memory 1616 by a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of RAM device. The non-volatile memory 1616 may be implemented by flash memory and/or any other desired type of memory device. Access to the main memory 1614, 1616 of the illustrated example is controlled by a memory controller 1617.

The processor platform 1600 of the illustrated example also includes an interface circuitry 1620. The interface circuitry 1620 may be implemented by any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1622 are connected to the interface circuitry 1620. The input device(s) 1622 permit(s) a user to enter data and/or commands into the processor circuitry 1612. In this example, the input device(s) 1622 can include the button 132, 832 and the sensor(s) 1406. Additionally or alternatively, the input device(s) 1622 can be implemented by, for example, an audio sensor, a microphone, a camera (still or video), a keyboard (e.g., the keyboard 126, 826), a mouse, a touchscreen (e.g., the first display screen 110, 810, the second display screen 128, 828), a track-pad (e.g., the trackpad 827), a trackball, an isopoint device, and/or a voice recognition system.

One or more output devices 1624 are also connected to the interface circuitry 1620 of the illustrated example. In this example, the output device(s) 1624 can include the actuator 700. Additionally or alternatively, the output devices 1624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1620 of the illustrated example, thus, typically includes a graphics driver card, a graphics driver chip and/or graphics processor circuitry such as a GPU.

The interface circuitry 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1600 of the illustrated example also includes one or more mass storage devices 1628 to store software and/or data. Examples of such mass storage devices 1628 include magnetic storage devices, optical storage devices, floppy disk drives, HDDs, CDs, Blu-ray disk drives, redundant array of independent disks (RAID) systems, and solid state storage devices such as a flash memory device, and drives.

The machine executable instructions 1632, which may be implemented by the machine readable instructions 1500 of FIG. 15, may be stored in the mass storage device 1628, in the volatile memory 1614, in the non-volatile memory 1616, and/or on a removable non-transitory computer readable storage medium such as a CD or DVD.

Figure 17:
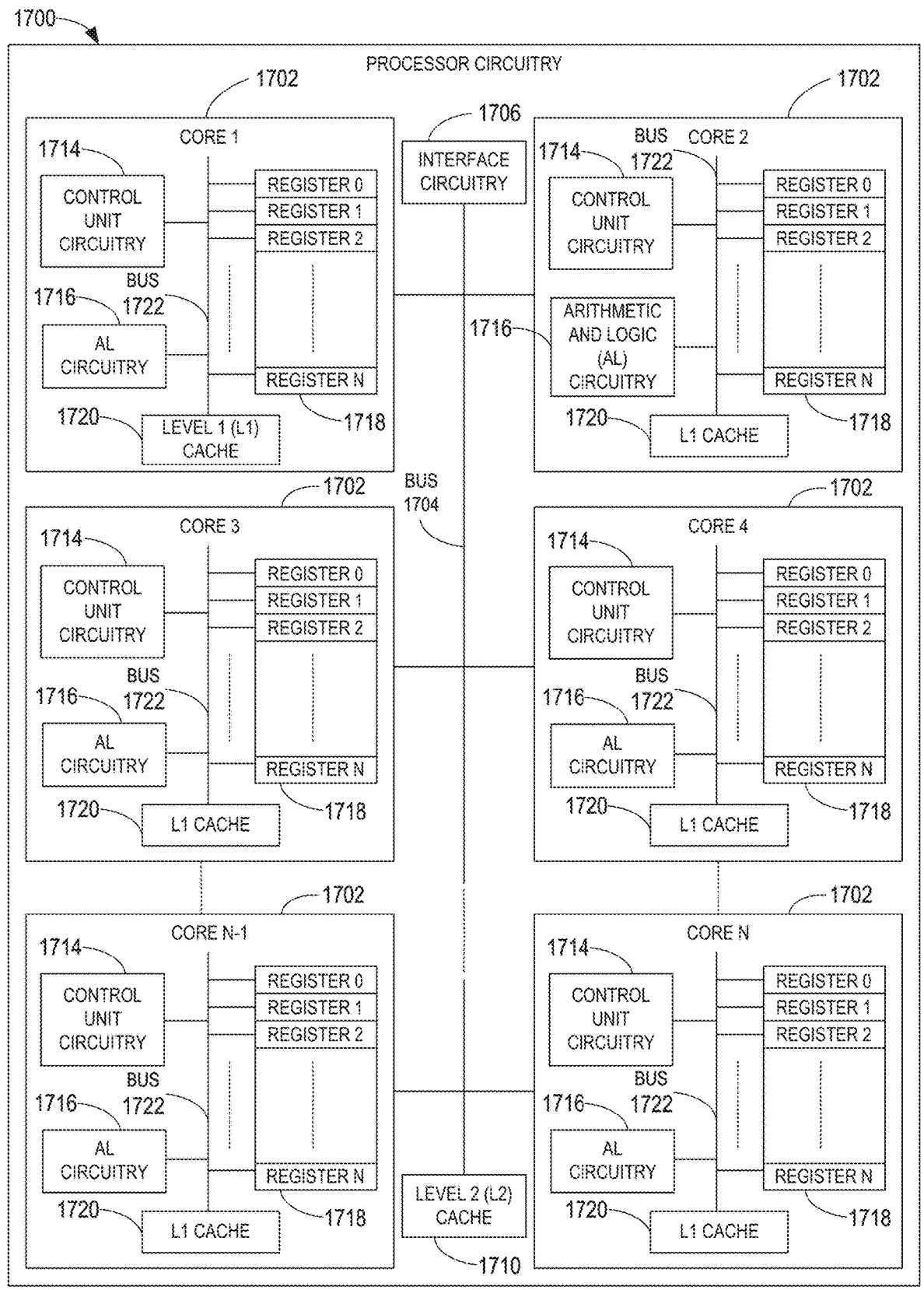
FIG. 17 is a block diagram of an example implementation of the processor circuitry of FIG. 16.

FIG. 17 is a block diagram of an example implementation of the processor circuitry 1612 of FIG. 16. In this example, the processor circuitry 1612 of FIG. 16 is implemented by a microprocessor 1700. For example, the microprocessor 1700 may implement multi-core hardware circuitry such as a CPU, a DSP, a GPU, an XPU, etc. Although it may include any number of example cores 1702 (e.g., 1 core), the microprocessor 1700 of this example is a multi-core semiconductor device including N cores. The cores 1702 of the microprocessor 1700 may operate independently or may cooperate to execute machine readable instructions. For example, machine code corresponding to a firmware program, an embedded software program, or a software program may be executed by one of the cores 1702 or may be executed by multiple ones of the cores 1702 at the same or different times. In some examples, the machine code corresponding to the firmware program, the embedded software program, or the software program is split into threads and executed in parallel by two or more of the cores 1702. The software program may correspond to a portion or all of the machine readable instructions and/or operations represented by the flowchart of FIG. 15.

The cores 1702 may communicate by an example bus 1704. In some examples, the bus 1704 may implement a communication bus to effectuate communication associated with one(s) of the cores 1702. For example, the bus 1704 may implement at least one of an Inter-Integrated Circuit (I2C) bus, a Serial Peripheral Interface (SPI) bus, a PCI bus, or a PCIe bus. Additionally or alternatively, the bus 1704 may implement any other type of computing or electrical bus. The cores 1702 may obtain data, instructions, and/or signals from one or more external devices by example interface circuitry 1706. The cores 702 may output data, instructions, and/or signals to the one or more external devices by the interface circuitry 1706. Although the cores 1702 of this example include example local memory 1720 (e.g., Level 1 (L1) cache that may be split into an L1 data cache and an L1 instruction cache), the microprocessor 1700 also includes example shared memory 1710 that may be shared by the cores (e.g., Level 2 (L2_cache)) for high-speed access to data and/or instructions. Data and/or instructions may be transferred (e.g., shared) by writing to and/or reading from the shared memory 1710. The local memory 1720 of each of the cores 1702 and the shared memory 1710 may be part of a hierarchy of storage devices including multiple levels of cache memory and the main memory (e.g., the main memory 1614, 1616 of FIG. 16). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1702 may be referred to as a CPU, DSP, GPU, etc., or any other type of hardware circuitry. Each core 1702 includes control unit circuitry 1714, arithmetic and logic (AL) circuitry (sometimes referred to as an ALU) 1716, a plurality of registers 1718, the L1 cache 1720, and an example bus 1722. Other structures may be present. For example, each core 1702 may include vector unit circuitry, single instruction multiple data (SIMD) unit circuitry, load/store unit (LSU) circuitry, branch/jump unit circuitry, floating-point unit (FPU) circuitry, etc. The control unit circuitry 1714 includes semiconductor-based circuits structured to control (e.g., coordinate) data movement within the corresponding core 702. The AL circuitry 1716 includes semiconductor-based circuits structured to perform one or more mathematic and/or logic operations on the data within the corresponding core 1702. The AL circuitry 1716 of some examples performs integer based operations. In other examples, the AL circuitry 1716 also performs floating point operations. In yet other examples, the AL circuitry 1716 may include first AL circuitry that performs integer based operations and second AL circuitry that performs floating point operations. In some examples, the AL circuitry 1716 may be referred to as an Arithmetic Logic Unit (ALU). The registers 1718 are semiconductor-based structures to store data and/or instructions such as results of one or more of the operations performed by the AL circuitry 1716 of the corresponding core 1702. For example, the registers 1718 may include vector register(s), SIMD register(s), general purpose register(s), flag register(s), segment register(s), machine specific register(s), instruction pointer register(s), control register(s), debug register(s), memory management register(s), machine check register(s), etc. The registers 1718 may be arranged in a bank as shown in FIG. 17. Alternatively, the registers 1718 may be organized in any other arrangement, format, or structure including distributed throughout the core 1702 to shorten access time. The bus 1720 may implement at least one of an I2C bus, a SPI bus, a PCI bus, or a PCIe bus.

Each core 1702 and/or, more generally, the microprocessor 1700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 18:
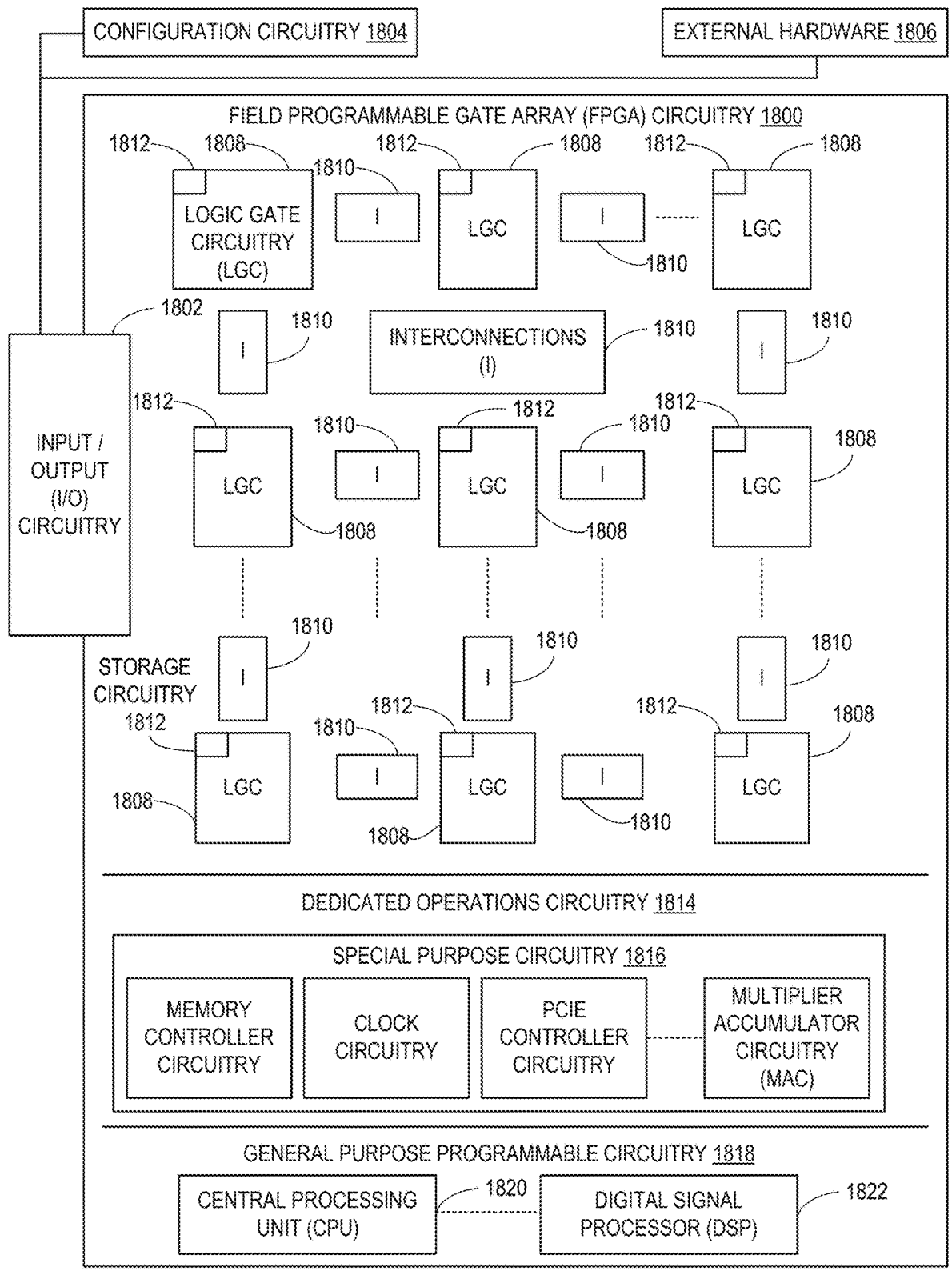
FIG. 18 is a block diagram of another example implementation of the processor circuitry of FIG. 16.

FIG. 18 is a block diagram of another example implementation of the processor circuitry 1612 of FIG. 16. In this example, the processor circuitry 1612 is implemented by FPGA circuitry 1800. The FPGA circuitry 1800 can be used, for example, to perform operations that could otherwise be performed by the example microprocessor 1700 of FIG. 17 executing corresponding machine readable instructions. However, once configured, the FPGA circuitry 1800 instantiates the machine readable instructions in hardware and, thus, can often execute the operations faster than they could be performed by a general purpose microprocessor executing the corresponding software.

More specifically, in contrast to the microprocessor 1700 of FIG. 17 described above (which is a general purpose device that may be programmed to execute some or all of the machine readable instructions represented by the flowchart of FIG. 15 but whose interconnections and logic circuitry are fixed once fabricated), the FPGA circuitry 1800 of the example of FIG. 18 includes interconnections and logic circuitry that may be configured and/or interconnected in different ways after fabrication to instantiate, for example, some or all of the machine readable instructions represented by the flowchart of FIG. 15. In particular, the FPGA 1800 may be thought of as an array of logic gates, interconnections, and switches. The switches can be programmed to change how the logic gates are interconnected by the interconnections, effectively forming one or more dedicated logic circuits (unless and until the FPGA circuitry 1800 is reprogrammed). The configured logic circuits enable the logic gates to cooperate in different ways to perform different operations on data received by input circuitry. Those operations may correspond to some or all of the software represented by the flowchart of FIG. 15. As such, the FPGA circuitry 1800 may be structured to effectively instantiate some or all of the machine readable instructions of the flowchart of FIG. 15 as dedicated logic circuits to perform the operations corresponding to those software instructions in a dedicated manner analogous to an ASIC. Therefore, the FPGA circuitry 1800 may perform the operations corresponding to the some or all of the machine readable instructions of FIG. 15 faster than the general purpose microprocessor can execute the same.

In the example of FIG. 18, the FPGA circuitry 1800 is structured to be programmed (and/or reprogrammed one or more times) by an end user by a hardware description language (HDL) such as Verilog. The FPGA circuitry 1800 of FIG. 18, includes example input/output (I/O) circuitry 1802 to obtain and/or output data to/from example configuration circuitry 1804 and/or external hardware (e.g., external hardware circuitry) 1806. For example, the configuration circuitry 1804 may implement interface circuitry that may obtain machine readable instructions to configure the FPGA circuitry 1800, or portion(s) thereof. In some such examples, the configuration circuitry 1804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1806 may implement the microprocessor 1700 of FIG. 17. The FPGA circuitry 1800 also includes an array of example logic gate circuitry 1808, a plurality of example configurable interconnections 1810, and example storage circuitry 1812. The logic gate circuitry 1808 and interconnections 1810 are configurable to instantiate one or more operations that may correspond to at least some of the machine readable instructions of FIG. 15 and/or other desired operations. The logic gate circuitry 1808 shown in FIG. 18 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1808 to enable configuration of the electrical structures and/or the logic gates to form circuits to perform desired operations. The logic gate circuitry 1808 may include other electrical structures such as look-up tables (LUTs), registers (e.g., flip-flops or latches), multiplexers, etc.

The interconnections 1810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1808 to program desired logic circuits.

The storage circuitry 1812 of the illustrated example is structured to store result(s) of the one or more of the operations performed by corresponding logic gates. The storage circuitry 1812 may be implemented by registers or the like. In the illustrated example, the storage circuitry 1812 is distributed amongst the logic gate circuitry 1808 to facilitate access and increase execution speed.

The example FPGA circuitry 1800 of FIG. 18 also includes example Dedicated Operations Circuitry 1814. In this example, the Dedicated Operations Circuitry 1814 includes special purpose circuitry 1816 that may be invoked to implement commonly used functions to avoid the need to program those functions in the field. Examples of such special purpose circuitry 1816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1800 may also include example general purpose programmable circuitry 1818 such as an example CPU 1820 and/or an example DSP 1822. Other general purpose programmable circuitry 1818 may additionally or alternatively be present such as a GPU, an XPU, etc., that can be programmed to perform other operations.

Although FIGS. 17 and 18 illustrate two example implementations of the processor circuitry 1612 of FIG. 16, many other approaches are contemplated. For example, as mentioned above, modern FPGA circuitry may include an on-board CPU, such as one or more of the example CPU 1820 of FIG. 18. Therefore, the processor circuitry 1612 of FIG. 16 may additionally be implemented by combining the example microprocessor 1700 of FIG. 17 and the example FPGA circuitry 1800 of FIG. 18. In some such hybrid examples, a first portion of the machine readable instructions represented by the flowchart of FIG. 15 may be executed by one or more of the cores 1702 of FIG. 17 and a second portion of the machine readable instructions represented by the flowchart of FIG. 15 may be executed by the FPGA circuitry 1800 of FIG. 18.

In some examples, the processor circuitry 1612 of FIG. 16 may be in one or more packages. For example, the processor circuitry 1700 of FIG. 17 and/or the FPGA circuitry 1800 of FIG. 18 may be in one or more packages. In some examples, an XPU may be implemented by the processor circuitry 1612 of FIG. 16, which may be in one or more packages. For example, the XPU may include a CPU in one package, a DSP in another package, a GPU in yet another package, and an FPGA in still yet another package.

Examples and example combination disclosed herein include the following:

Example 1 is an electronic device comprising a lid having a first display screen and a base. The is lid moveably coupled to the base. The base includes a housing having a top side and a bottom side, a physical keyboard to be accessed on the top side of the housing, and a second display screen moveable between a first position in which the keyboard is exposed and a second position in which the second display screen covers the keyboard.

Example 2 includes the electronic device of Example 1, wherein the housing has a slot, and the second display screen is moveable into and out of the housing through the slot.

Example 3 includes the electronic device of Example 2, wherein the slot is in the bottom side of the housing adjacent a front edge of the housing.

Example 4 includes the electronic device of any of Examples 1-3, wherein the base includes an actuator to move the second display screen from the first position to the second position.

Example 5 includes the electronic device of Example 4, wherein the base includes a first magnetic element coupled to a back side of the second display screen. The first magnetic element is disposed between the second display screen and an outer surface of the top side of the housing. The base also includes a second magnetic element in the housing adjacent an inner surface of the top side of the housing. The first magnetic element is magnetically attracted to the second magnetic element. The actuator is to move the second magnetic element to thereby move the first magnetic element and the second display screen from the first position to the second position.

Example 6 includes the electronic device of Example 5, wherein the first magnetic element is adjacent a top edge of the second display screen.

Example 7 includes the electronic device of Examples 5 or 6, wherein the base includes a first pad between the first magnetic element and the outer surface of the top side of the housing to facilitate sliding of the first magnetic element along the top side of the housing and a second pad between the second magnetic element and the inner surface of the top side of the housing to facilitate sliding of the second magnetic element along the top side of the housing.

Example 8 includes the electronic device of any of Examples 1-7, wherein, when the second display screen is in the second position, a top edge of the second display screen is adjacent the lid.

Example 9 includes the electronic device of any of Examples 1-8, wherein the second display screen is flexible.

Example 10 includes the electronic device of any of Examples 1-9, wherein, when the second display screen is in the first position, a first portion of the second display screen is disposed along the top side of the housing, and a second portion of the display screen is inside the housing.

Example 11 includes the electronic device of Example 10, wherein, when the second display screen is in the first position, the first portion of the second display screen is to operate as a trackpad.

Example 12 includes the electronic device of Examples 10 or 11, further including a roller in the housing, the second portion of the second display screen wrapped around the roller when the second display screen is in the first position.

Example 13 includes the electronic device of Example 12, wherein the roller is adjacent a front edge of the housing.

Example 14 includes the electronic device of Examples 12 or 13, wherein the roller is spring loaded to bias the second display screen to the first position.

Example 15 includes the electronic device of any of Examples 1-14, wherein the base includes a trackpad on the top side of the housing. The trackpad is between the keyboard and a front edge of the housing. When the second display screen is in the first position the trackpad is exposed, and when the second display screen is in the second position the trackpad is covered by the second display screen.

Example 16 includes the electronic device of Example 15, wherein, when the second display screen is in the first position, a first portion of the second display screen is disposed along the front edge of the housing and a second portion of the second display screen is inside the housing.

Example 17 includes the electronic device of Example 16, wherein, when the second display screen is in the first position, the first portion of the second display screen is to display information along the front edge of the housing.

Example 18 includes the electronic device of Examples 16 or 17, wherein the base includes a roller adjacent a rear edge of the housing opposite the front edge of the housing and a belt coupled to the second display screen. The belt wrapped is around the roller.

Example 19 includes the electronic device of Example 18, wherein the roller is spring loaded to bias the second display screen to the first position.

Example 20 is an electronic device comprising a housing having a first side and a second side opposite the first side, the housing having a slot, a physical keyboard on the first side of the housing, and a display screen at least partially in the housing, through the slot, and along an outer surface of the housing. The display screen is moveable from a first position in which the keyboard is exposed and a second position in which the display screen at least partially covers the keyboard.

Example 21 includes the electronic device of Example 20, further including a roller in the housing, at least a portion of the display screen wrapped around the roller when the display screen is in the first position.

Example 22 includes the electronic device of Examples 20 or 21, wherein the display screen is flexible.

Example 23 includes the electronic device of any of Examples 20-22, further including an actuator in the housing to move the display screen from the first position to the second position.

Example 24 includes the electronic device of any of Examples 20-23, wherein the display screen includes at least one of an organic light-emitting diode (OLED) display screen, a mini-LED display screen, or a micro-LED display screen.

Example 25 is a non-transitory computer readable storage medium comprising instructions that, when executed, cause at least one processor to at least, in response to a command signal, activate an actuator to move a display screen along a top side of a base of an electronic device from a first position in which a physical keyboard carried by the base is at least partially exposed to a second position in which the display screen at least partially covers the keyboard, detect the display screen near the second position, and cease operation of the actuator.

Example 26 includes the non-transitory computer readable storage medium of Example 25, wherein the command signal is generated by a physical button on the electronic device.

Example 27 includes the non-transitory computer readable storage medium of Examples 25 or 26, wherein the command signal is a first command signal, and wherein the instructions, when executed, cause the at least one processor to, in response to a second command signal, activate the actuator to move the display screen from the second position to the first position, detect the display screen near the first position, and cease operation of the actuator.

Example 28 is a method comprising, in response to a command signal, activating an actuator to move a display screen along a top side of a base of an electronic device from a first position in which a physical keyboard carried by the base is at least partially exposed to a second position in which the display screen at least partially covers the keyboard, detecting the display screen near the second position, and ceasing operation of the actuator.

Example 29 includes the method of Example 28, wherein the command signal is generated by a physical button on the electronic device.

Example 30 includes the method of Examples 28 or 19, wherein the command signal is a first command signal, the method further including, in response to a second command signal, activating the actuator to move the display screen from the second position to the first position, detecting the display screen near the first position, and ceasing operation of the actuator.

From the foregoing, it will be appreciated that example methods, apparatus, systems, and articles of manufacture have been disclosed that enable an electronic device with a physical or mechanical keyboard to transition into a display screen, without having to remove the keyboard or add an external keyboard for operation. As such, the examples disclosed herein provide the user with the ability to utilize a physical keyboard (which is often desired over a virtual keyboard) in a first mode of operation and a large screen in a second mode of operation.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. An electronic device comprising:
a lid having a first display screen; and
a base, the lid moveably coupled to the base, the base including:
a housing having a top side and a bottom side;
a physical keyboard to be accessed on the top side of the housing; and
a second display screen moveable between a first position in which the keyboard is exposed and a second position in which the second display screen covers the keyboard, when the second display screen is in the first position, a first portion of the second display screen is along at least one of the top side of the housing or a front edge of the housing, and a second portion of the second display screen is inside the housing.

2. The electronic device of claim 1, wherein the housing has a slot, the second display screen moveable into and out of the housing through the slot.

3. The electronic device of claim 1, wherein the base includes an actuator to move the second display screen from the first position to the second position.

4. An electronic device comprising:
a lid having a first display screen; and
a base, the lid moveably coupled to the base, the base including:
a housing having a top side and a bottom side;
a physical keyboard to be accessed on the top side of the housing;
a second display screen moveable between a first position in which the keyboard is exposed and a second position in which the second display screen covers the keyboard;
an actuator to move the second display screen from the first position to the second position;
a first magnetic element coupled to a back side of the second display screen, the first magnetic element between the second display screen and an outer surface of the top side of the housing; and
a second magnetic element in the housing adjacent an inner surface of the top side of the housing, the first magnetic element magnetically attracted to the second magnetic element, the actuator to move the second magnetic element to thereby move the first magnetic element and the second display screen from the first position to the second position.

5. The electronic device of claim 4, wherein the base includes:
a first pad between the first magnetic element and the outer surface of the top side of the housing to facilitate sliding of the first magnetic element along the top side of the housing; and
a second pad between the second magnetic element and the inner surface of the top side of the housing to facilitate sliding of the second magnetic element along the top side of the housing.

6. The electronic device of claim 1, wherein the second display screen is flexible.

7. The electronic device of claim 1, wherein, when the second display screen is in the first position, the first portion of the second display screen is to operate as a trackpad.

8. The electronic device of claim 1, further including a roller in the housing, the second portion of the second display screen wrapped around the roller when the second display screen is in the first position.

9. The electronic device of claim 8, wherein the roller is spring loaded to bias the second display screen to the first position.

10. The electronic device of claim 1, wherein the base includes a trackpad on the top side of the housing, the trackpad between the keyboard and the front edge of the housing, when the second display screen is in the first position the trackpad is exposed, and when the second display screen is in the second position the trackpad is covered by the second display screen.

11. The electronic device of claim 1, wherein the base includes:
a roller adjacent a rear edge of the housing opposite the front edge of the housing; and
a belt coupled to the second display screen, the belt wrapped around the roller.

12. The electronic device of claim 11, wherein the roller is spring loaded to bias the second display screen to the first position.

13. An electronic device comprising:
a housing having a first side and a second side opposite the first side, the housing having a slot;
a physical keyboard on the first side of the housing;
a display screen at least partially in the housing, through the slot, and along an outer surface of the housing, the display screen moveable from a first position in which the keyboard is exposed and a second position in which the display screen at least partially covers the keyboard; and
a roller in the housing, at least a portion of the display screen wrapped around the roller when the display screen is in the first position.

14. The electronic device of claim 13, further including an actuator in the housing to move the display screen from the first position to the second position.

15. The electronic device of claim 1, wherein, when the second display screen is in the first position, the first portion of the second display screen is to display information along the front edge of the housing.

16. The electronic device of claim 2, wherein the slot is in the bottom side of the housing adjacent the front edge of the housing.

17. The electronic device of claim 4, wherein the first magnetic element is adjacent a top edge of the second display screen.

18. The electronic device of claim 8, wherein the roller is adjacent the front edge of the housing.

19. The electronic device of claim 13, wherein the display screen is flexible.

20. The electronic device of claim 13, wherein the display screen includes at least one of an organic light-emitting diode (OLED) display screen, a mini-LED display screen, or a micro-LED display screen.

* * * * *